(12) United States Patent
Plutt et al.

(10) Patent No.: US 8,800,858 B2
(45) Date of Patent: Aug. 12, 2014

(54) TANDEM SPOT SCANNING FOR A STORAGE LIBRARY

(75) Inventors: Daniel James Plutt, Superior, CO (US); Timothy Craig Ostwald, Boulder, CO (US); Joseph Paul Manes, Arvada, CO (US)

(73) Assignee: Oracle International Corporation, Redwood City, CA (US)

( * ) Notice: Subject to any disclaimer, the term of this patent is extended or adjusted under 35 U.S.C. 154(b) by 309 days.

(21) Appl. No.: 13/464,927

(22) Filed: May 4, 2012

(65) Prior Publication Data

US 2013/0292461 A1 Nov. 7, 2013

(51) Int. Cl.
*G06K 7/10* (2006.01)
(52) U.S. Cl.
USPC .......................................... 235/375; 235/470
(58) Field of Classification Search
USPC ................................................ 235/375, 470
See application file for complete search history.

(56) References Cited

U.S. PATENT DOCUMENTS

2013/0221086 A1* 8/2013 Holdman et al. ............. 235/375
2013/0317643 A1* 11/2013 Ostwald et al. ............... 700/218

* cited by examiner

*Primary Examiner* — Allyson Trail
(74) *Attorney, Agent, or Firm* — Marsh Fischmann & Breyfogle LLP; Daniel J. Sherwinter

(57) ABSTRACT

Systems and methods are described for using topographic and/or contrast spot scanning to facilitate various types of functionality in context of a data storage library. A robotic mechanism includes a hand assembly that has one or more integrated spot scanners. The hand assembly is configured to travel in at least two directions and to rotate, thereby locating and/or pointing the spot scanner in desired locations throughout the data storage library. By sweeping the spot scanner across a scan window, contrast and/or topographic data can be acquired and decoded to generate a profile of a region. The profile can be interpreted to facilitate functions, such as calibration of robot location with respect to media cartridges, targeting, proximity detection, empty cell detection, etc.

20 Claims, 18 Drawing Sheets

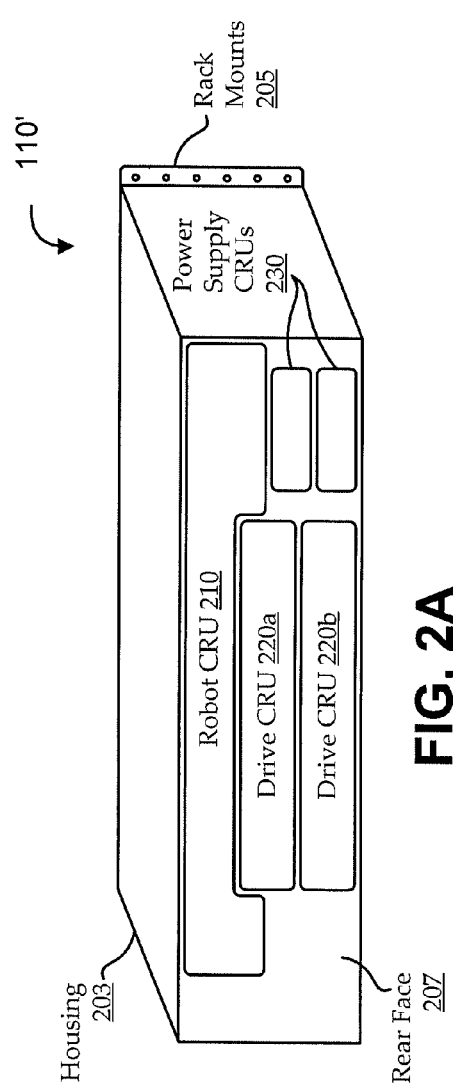
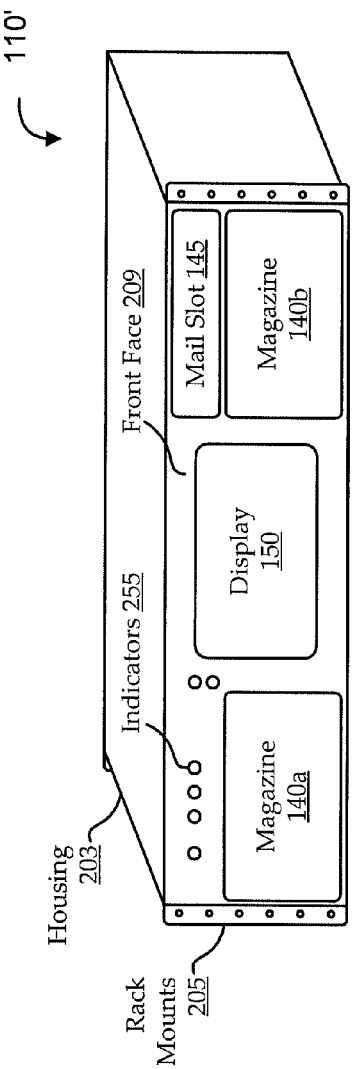
FIG. 2A
FIG. 2B

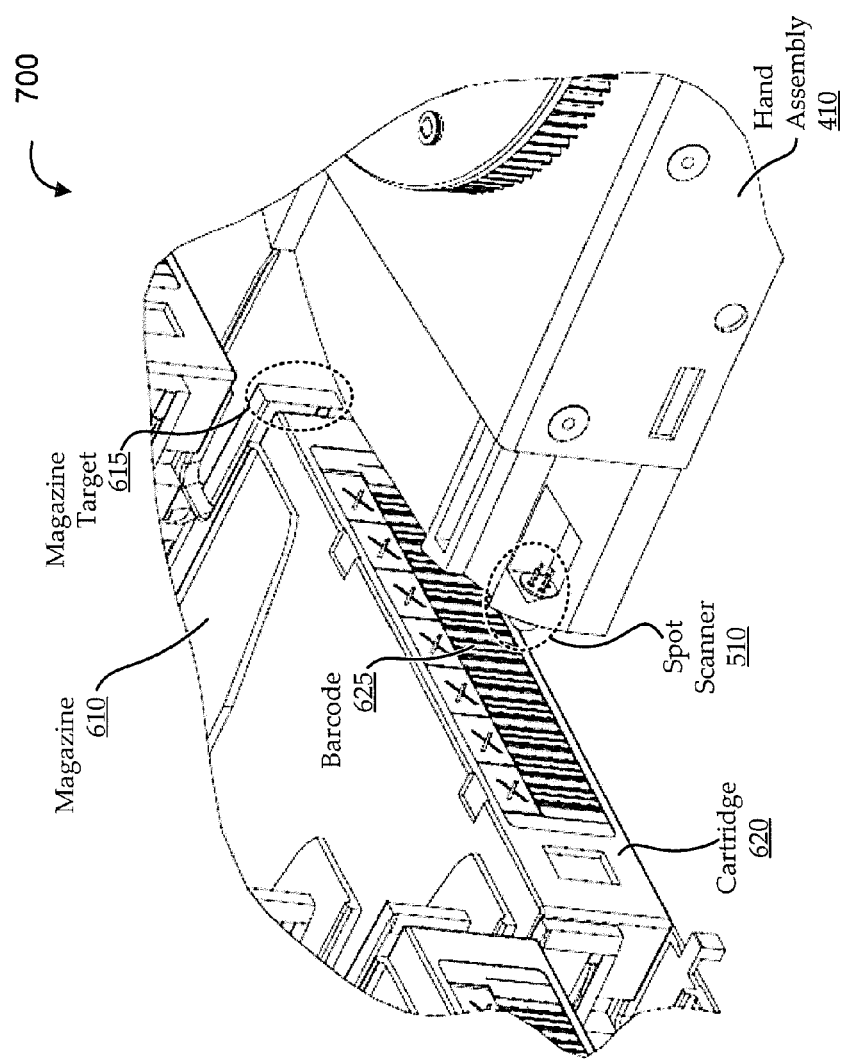

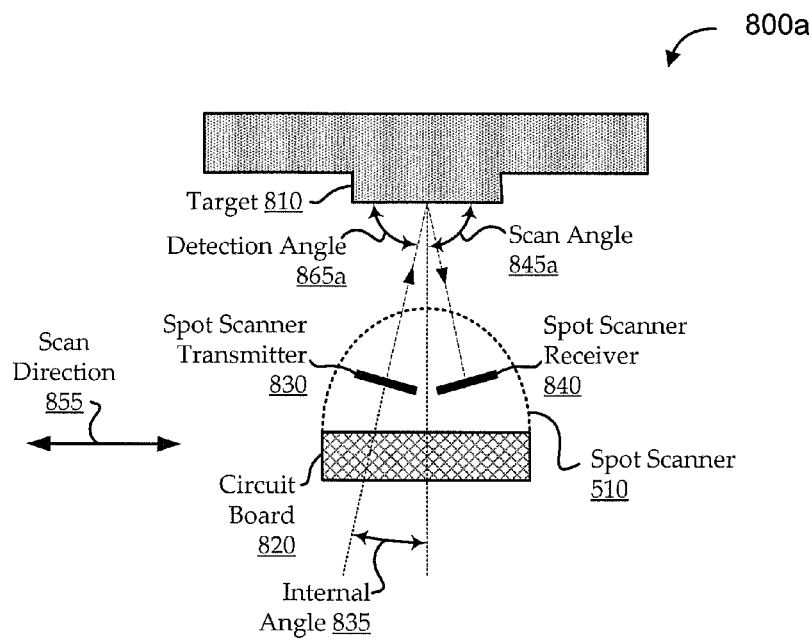
FIG. 8A
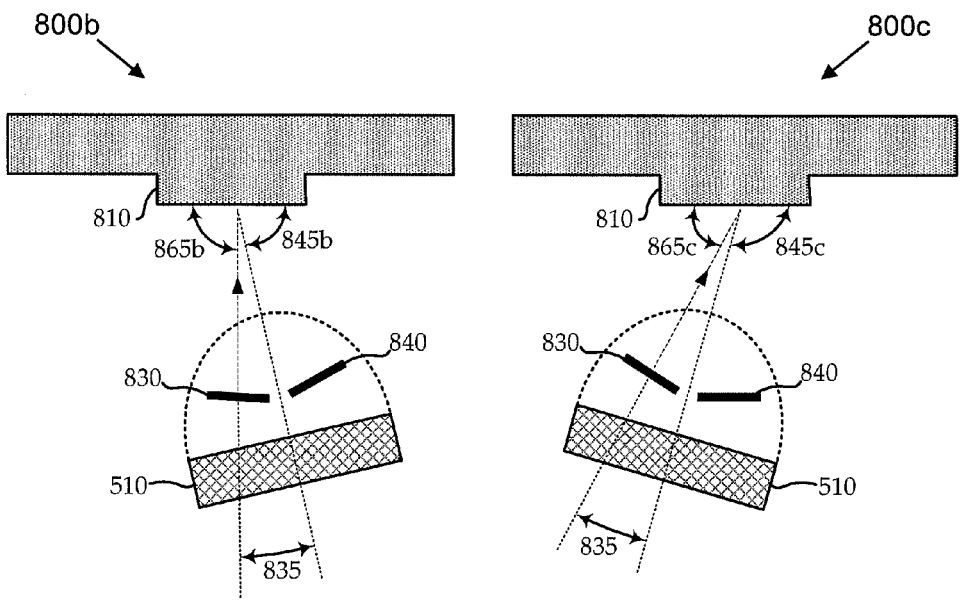
FIG. 8B　　　　　　　FIG. 8C

TANDEM SPOT SCANNING FOR A STORAGE LIBRARY

FIELD

Embodiments relate generally to data storage systems, and, more particularly, to use of spot scanners for targeting, location, symbol recognition, and/or the like in storage libraries.

BACKGROUND

Storage library systems are often used by enterprises and the like to efficiently store and retrieve data from storage media. In the case of some storage libraries, the media are data cartridges (e.g., tape cartridges) that are typically stored and indexed within a set of magazines. When particular data is requested, a specialized robotic mechanism finds the appropriate cartridge, removes the cartridge from its magazine, and carries the cartridge to a drive that is designed to receive the cartridge and read its contents. Some storage libraries have multiple drives that can operate concurrently to perform input/output (IO) operations on multiple cartridges.

Operation of the robotic mechanism in the context of a data storage system, typically involves a number of different location related tasks. For example, the robotic mechanism may be used for targeting of specific locations within the data storage system, for performing pick and place operations on media cartridges, for reading barcodes and/or other symbols or features, for auditing the existence and/or absence of media cartridges in magazines or drives, etc. Each of these and other operations can be frustrated when location-related errors are introduced into the environment, if proper corrective feedback is not provided. For example, errors can easily be introduced into the system from physical jarring or manipulation of components, from compounding of errors inherent in electronic components, etc.

Many different techniques are used in an attempt to account for these errors and to accurately locate, or determine the location of, the robotic mechanism or its constituent features in the context of the storage library. Various implementations use stepper motors, physical stops, electromechanical sensors, electro-optical sensors, and/or other techniques. For example, the carriage may move until it detects via one or more sensors that it has reached a desired location. Traditional implementations use a number of different sensors and other location and feedback techniques to provide all the different functionality desired from the robotic mechanism, including scanning and location-related tasks. This may involve integrating large numbers of components, which can add complexity, cost, and weight, while also potentially increasing the rate of failure.

BRIEF SUMMARY

Among other things, systems and methods are described that use multiple spot scanners in tandem to provide functionality, such as increased scannable area within a structural framework, and concurrent scanning of non-adjacent magazine locations. Some embodiments operate in context of a data storage library having a robotic mechanism that finds, picks, and places media cartridges in magazines and/or media drives. The robotic mechanism includes a hand assembly that has multiple integrated spot scanners (e.g., implemented as vertical-cavity surface-emitting lasers (VCSELs)). In certain implementations, the spot scanners are positioned (e.g., located and/or oriented) in fixed relative position to one another, for example, on the hand assembly. By moving and/or rotating the hand assembly the spot scanners can be located and/or pointed in relation to desired locations throughout the data storage library. The hand assembly can also be used to sweep the spot scanners across a scan window to collect contrast and/or topographic data (e.g., color and/or depth information over a series of locations).

According to one set of embodiments, a system is provided for spot scanning in a data storage system. The system includes: a first spot scanner coupled with a carriage, the carriage configured to move in at least a scan direction and to rotate about a reference axis to point the first spot scanner in a detection direction, such that, when the detection direction is perpendicular to the scan direction, the detection direction and the scan direction define four quadrants of the carriage, the first spot scanner being in one of the four quadrants; a second spot scanner coupled with the carriage in another of the four quadrants; a driver configured to move the carriage in the scan direction to sweep the spot scanners to acquire raw scan data at each of a plurality of locations within at least one scan window; and a processor, in communication with the spot scanners. The processor is configured to: direct at least one of the spot scanners to acquire the raw scan data; decode the raw scan data to generate a scan profile for a purported feature within the at least one scan window; and analyze the scan profile to determine a valid feature corresponding to the purported feature and a feature characteristic associated with the valid feature.

According to another set of embodiments, a method is provided for spot scanning in a data storage system. The method includes: moving a carriage using an electromechanical driver to a first movement extent, the carriage configured to move in at least a scan direction between the first movement extent and a second movement extent and to rotate about a reference axis to point at least one of a plurality of spot scanners in a detection direction with reference to a set of target features to acquire raw scan data from the set of target features within any window between a first scanning extent and a second scanning extent; rotating the carriage to point the first spot scanner in a particular detection direction that is predetermined to be optimal for acquiring raw scan data from the set of target features, the first spot scanner being located on the carriage so that it points substantially at the first scanning extent when the carriage is at the first movement extent and the first spot scanner is pointed in the particular detection direction; moving the carriage to the second movement extent; and rotating the carriage to point the second spot scanner in the particular detection direction, the second spot scanner being located on the carriage so that it points substantially at the second scanning extent when the carriage is at the second movement extent and the second spot scanner is pointed in the particular detection direction.

According to yet another set of embodiments, another method is provided for spot scanning in a data storage system. The method includes: positioning a carriage using an electromechanical driver in a first position; rotating the carriage about a reference axis to point a first spot scanner in a first detection direction with reference to a first target feature and to point a second spot scanner in second detection direction with reference to a second target feature, the first and second spot scanners coupled with the carriage in non-adjacent locations; and concurrently acquiring, by sweeping the carriage in a scan direction from the first position to a second position, first raw scan data from the first target feature using the first spot scanner and second raw scan data from the second target feature using the second spot scanner.

BRIEF DESCRIPTION OF THE DRAWINGS

The present disclosure is described in conjunction with the appended figures:

FIGS. 2A and 2B show rear and front views, respectively, of an illustrative base module, according to various embodiments;

FIG. 7 shows a close-up view of a partial module environment, such as within the module of FIG. 6A or 6B;

FIGS. 8A-8C show simplified views of an illustrative spot scanner implemented as a VCSEL pointing at different scan angles, according to various embodiments;

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
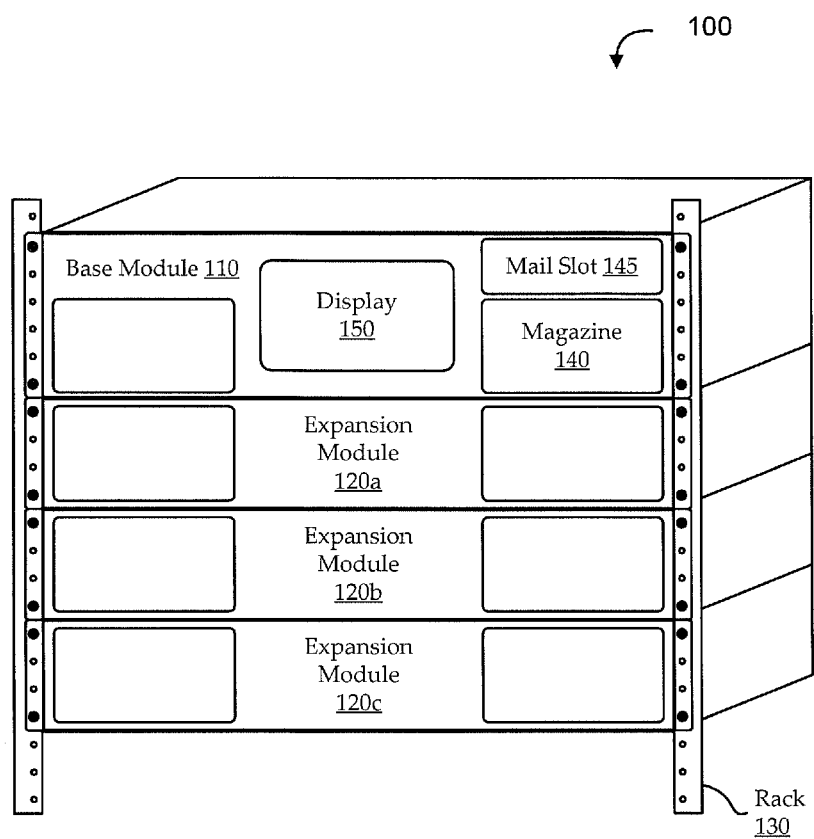
FIG. 1 shows a block diagram of an illustrative rack-mounted storage library, to provide a context for various embodiments.

For the sake of context, FIG. 1 shows a rack-mounted storage library 100 for use with various embodiments. The storage library 100 includes a base module 110 and one or more expansion modules 120, configured to be mounted in an equipment rack 130 (only the mounting rails of the equipment rack 130 are shown for simplicity). The base module 110 and expansion modules 120 provide physical storage for multiple storage media cartridges (e.g., tape cartridges) in magazines 140. Embodiments also include one or more media drives (e.g., tape drives), controllers, power supplies, indicators, communications subsystems, and/or other functions. As will be discussed more fully below, the storage library 100 also includes a robotic mechanism for finding and ferrying storage media cartridges between locations within the storage library 100 (e.g., magazines 140 and drives).

According to an illustrative embodiment, the storage library 100 is a small, rack-mounted, automated tape library. The base module 110 is "3 RU" high (three standard rack units, or approximately 5.25-inch high) and includes one robotic mechanism. Up to nine additional, "2 RU" high (approximately 3.5-inch high) expansion modules 120 can be added to provide additional drive and/or magazine 140 slot capacity, so that a maximum configuration of one base module 110 and nine expansion modules 120 has a total height of "21 RU," or half of a standard equipment rack 130. The single robot mechanism is configured to access all magazine 140 slots and drives in the base module 110 and all expansion modules 120.

In the illustrative embodiment, each of the base module 110 and the expansion modules 120 can house up to two half-height or one full-height LTO5 tape drives. Each of the base module 110 and the expansion modules 120 can also house two removable magazines 140, each having fifteen cartridge slots. In some implementations, the storage library 100 can be divided into partitions each associated with, for example, at least one drive and at least one magazine 140. Each partition can be configured to behave as an independent library, notwithstanding that all partitions share the single robotic mechanism (e.g., partitions can be commanded as independent libraries for tape operations, while sharing many resources for service and administration). Some implementations also include a "mailslot" 145 in the base module 110, as discussed below.

Some embodiments provide local and remote management of various functions through graphical user interfaces (GUI). In one implementation, the local interface GUI is displayed on a seven-inch, front-mounted, touch-screen panel display 150. The remote interface may be implemented as a browser-based interface (BUI), accessible by connecting a web browser to the library's Internet protocol (IP) address.

Some embodiments are configured to be installable and serviceable by end customers to the greatest extent practical. For example, an installation wizard may be provided to simplify initial installation, a simple rack rail system for base modules 110 and expansion modules 120 will allow two people without any mechanical assistance (e.g. lift) to easily install the modules on an equipment rack 130. In some such embodiments, most replaceable library components will be Customer Replaceable Units (CRUs) (i.e., as opposed to field replaceable units (FRUs), which are serviceable and/or replaceable only by trained technicians). For example, certain implementations allow almost all installation, maintenance, upgrades, and/or normal use of the storage library 100 to be performed with only front and rear access to the equipment rack 130 and few or no tools.

FIGS. 2A and 2B show rear and front views, respectively, of an illustrative base module 110', according to various embodiments. The illustrative base module 110' may be an implementation of base module 110 of FIG. 1. As shown, the base module 110' includes a housing 203 (e.g., a chassis) configured with rack mounts 205 for mounting to an equipment rack (e.g., as shown in FIG. 1). A rear face 207 and a front face 209 are also shown as part of the housing 203. As discussed above, embodiments such as the one illustrated as base module 110', are designed to facilitate customer serviceability. Accordingly, most of the replaceable components are shown as accessible from the front and rear exterior of the base module 110', which would be substantially exposed when mounted in a standard equipment rack.

Looking at the rear view of the base module 110' in FIG. 2A, access is provided to a robot CRU 210, one or more drive CRUs 220, and one or more power supply CRUs 230. As will be described more fully below, the robot CRU 210 is configured to house the robotic mechanism and supporting components (e.g., mechanical drive modules, control hardware and software modules, configuration memory, etc.). Traditional storage library systems typically are configured so that the robotic mechanisms are only serviceable by highly trained personnel, and even removing the mechanism to send out for off-site servicing requires training, specialized tools, or the like. The ability to replace the entire robotic mechanism and all its supporting components in a single CRU is a novel improvement over traditional implementations. For example, implementations allow a customer to simply pop out a broken robot CRU 210 using a couple of thumb screws, slide in a replacement CRU, and reinitialize the system, without waiting for a technician to troubleshoot and fix any issues.

Embodiments of the drive CRUs 220 are media drive modules that can be removed by an end consumer. Various implementations support standard, half-height or full-height tape drives. As described more fully below, the port in the drive for receiving a media cartridge faces into the base module 110', so that media cartridges can only be inserted and/or removed by the robotic mechanism within the confines of the housing 203. In some implementations, one or more "external" media drives may be provided to facilitate troubleshooting and the like.

Embodiments of the power supply CRUs 230 include any useful type of power supply components for supplying power to the base module 110' and or to any other components (e.g., to one or more expansion modules 120 (not shown)). For example, the power supply CRUs 230 can include power generators, power converters, power conditioners, back-up batteries and/or other power duplication, switches, input and/or output ports, indicators, and the like. In some implementations, each power supply CRU 230 includes a male, three-prong connector for interfacing with line power and a main power switch. Some embodiments include a power supply CRU 230 for each drive CRU 220 (i.e., if the base module 110' has only a single drive CRU 220, it may also only have a single power supply CRU 230 to support the drive). In other embodiments, a second power supply CRU 230 is used as a backup supply to the first power supply CRU 230, and may be coupled with a different power source.

In one implementation, the base module 110' has slots for two power supplies (e.g., two power supply CRUs 230). These can be implemented as custom power supplies, for example, having an input voltage of 100-250 volts AC at 50-60 Hertz, and an output voltage of twelve volts DC switched plus five volts DC standby power. For example, the power supplies may be sized to run two tape drives plus robotics and any other sensors, etc. (e.g., with or without redundancy). Typically, the base module 110' has at least one power supply, even if no drives are included, to support the main processor, interface functionality (e.g., the display 150), etc.

Looking at the front view of the base module 110' in FIG. 2B, access is provided to a display 150, one or more magazines 140, and a mailslot 145. One or more indicators 255 may also be provided to show certain operational states, and the like (note that the sizes, numbers, positions, etc. of the indicators shown are intended only to be illustrative). In various implementations, base module 110 has overall library status indicators on the front and back of the module, along with a locate switch which activates the front and back locate LEDs; powered CRUs may have their own status indicators; hot-swappable CRUs can have indicators that show when the CRUs can be safely removed; power supplies and tape drives can have additional indicators; an "AC present" indicator can be provided to stay on even when the storage library is off (as long as AC power is connected). In one embodiment, a set of primary indicators include "locate," "fault," and "OK" indications. Next to the primary indicators are secondary indicators specific for the operator panel that indicate the status of the operator panel (e.g., an operator panel CRU, if implemented as such).

Other types of indications and status can also be provided using the display 150. Embodiments of the display 150 are used to facilitate various functionality through a local graphical user interface (GUI), including, for example, IO functions, service and diagnostic functions, etc. In one implementation, the display 150 is a seven-inch, front-mounted, touch-screen panel (e.g., an LCD touch panel display with a WVGA (wide VGA) 800×480 pixel screen equipped with a resistive or capacitive touch-sensitive overlay).

Each magazine 140 can be configured to hold multiple (e.g., up to fifteen) cartridges in such a way as to be reliably accessed by the robotic mechanism. For example, the magazines 140 can be designed to have features to aid in targeting, location, and or other functions of the robotic mechanism; features that securely hold the cartridges in place, while allowing for easy release of the cartridges to a robotic gripper when desired; features to add strength to the magazines 140 (e.g., to reduce sag, increase usable life, etc.) and/or to reduce weight; etc.

Embodiments of the mailslot 145 (or "Cartridge Access Port" (CAP)) include a special type of magazine designed to act as a controlled interface between the human user and the robotic mechanism. To add or remove cartridges from the storage library, a user ejects the mailslot 145 from the base module 110' and is presented with a number of cartridge slots (e.g., four "Import/Export cells" ("I/E cells")). The user can then insert cartridges into, or remove cartridges from, these slots without interfering with robotic mechanism's operations. In some implementations, the robotic mechanism is used to activate a latch internal to the base module 110, thereby allowing the user to remove the mailslot 145 only when the robotic mechanism is in an appropriate condition (e.g., parked in the robot CRU 210). Certain embodiments having data partitions (as discussed above) only allow one partition at a time to make use of the mailslot 145.

Figure 3A:
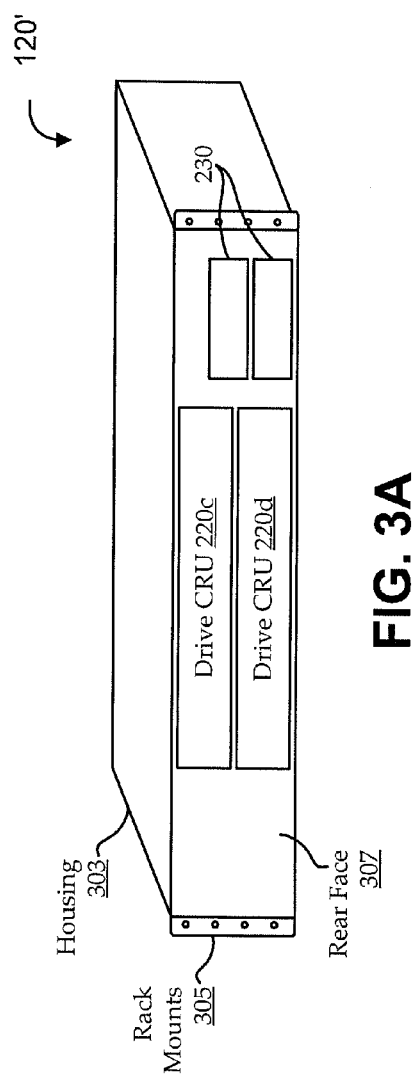
FIGS. 3A and 3B show rear and front views, respectively, of an illustrative expansion module, according to various embodiments.
Figure 3B:
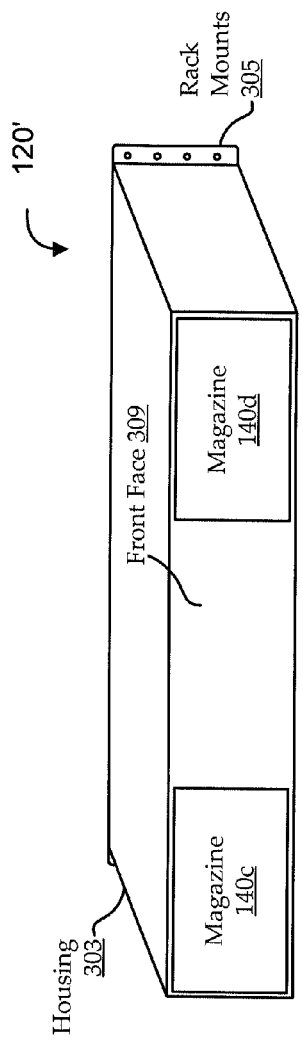

FIGS. 3A and 3B show rear and front views, respectively, of an illustrative expansion module 120', according to various embodiments. The illustrative expansion module 120' may be an implementation of expansion module 120 of FIG. 1. As shown, the expansion module 120' includes a housing 303

(e.g., a chassis) configured with rack mounts 305 for mounting to an equipment rack (e.g., as shown in FIG. 1). A rear face 307 and a front face 309 are also shown as part of the housing 303. As with the base module 110' of FIGS. 2A and 2B, the expansion module 120' is designed to facilitate customer serviceability. Most of the replaceable components are shown as accessible from the front and rear exterior of the expansion module 120', which would be substantially exposed when mounted in a standard equipment rack.

In the embodiment shown, various aspects of the expansion module 120' are similar or identical to the base module 110'. For example, embodiments of the expansion module 120' do not typically have a robot CRU 210, display 150, or mailslot 145, as they are configured to exploit that functionality from the base module 110' components. However, like the base module 110', the expansion module 120' includes one or more drive CRUs 220 and one or more power supply CRUs 230 configured to be accessed from the rear side of the expansion module 120', and one or more magazines 140 configured to be accessed from the front side of the expansion module 120'. In some embodiments, the drive CRUs 220, power supply CRUs 230, and/or magazines 140 of the expansion module 120' are the same as those implemented in the base module 110'.

Because of the lack of certain features in embodiments of the expansion module 120' (e.g., there may be no robot CRU 210, no main processor, etc.), expansion module 120' power requirements may be different from those of the base module 110. In certain implementations, the expansion modules 120' still have slots for two power supplies (e.g., two power supply CRUs 230), which can be implemented as the same power supplies used in the base module 110 (e.g., to avoid having to support or source multiple types of power supplies). However, the power supplies of the base module 110 may provide more power than is needed to run configurations of the expansion modules 120'. For example, a single power supply may be able to support an expansion module 120' even with two drives, and it is possible to implement an expansion module 120' with no drives and no power supplies. Alternatively, two power supplies may still be used, for example, to provide redundancy.

As discussed above, the base module 110' and expansion modules 120' include a number of components that can be designed for customer replaceability, including the robot CRU 210, drive CRUs 220, power supply CRUs 230, and magazines 140. It is worth noting that, even though these components may be accessible and replaceable by customers, embodiments may still be configured to prevent (or mitigate) undesirable interference with those components. As one example, those replaceable components typically are installed in a physically secure manner (e.g., using latches, thumbscrews, removable faceplates, and/or other techniques) to provide relatively easy access when needed, while mitigating inadvertent access (e.g., accidental removal of a magazine 140 during operation). As another example, certain embodiments may allow a drive CRU 220 to be removed during operation of the storage system, so long as the drive is not actively in use (e.g., by using a drive eject or park command, or other technique). As still another example, removal of the robot CRU 210 or magazines 145 may be prevented until certain operations have been completed (e.g., the robotic mechanism is parked within the base module 110', etc.).

Figure 4A:
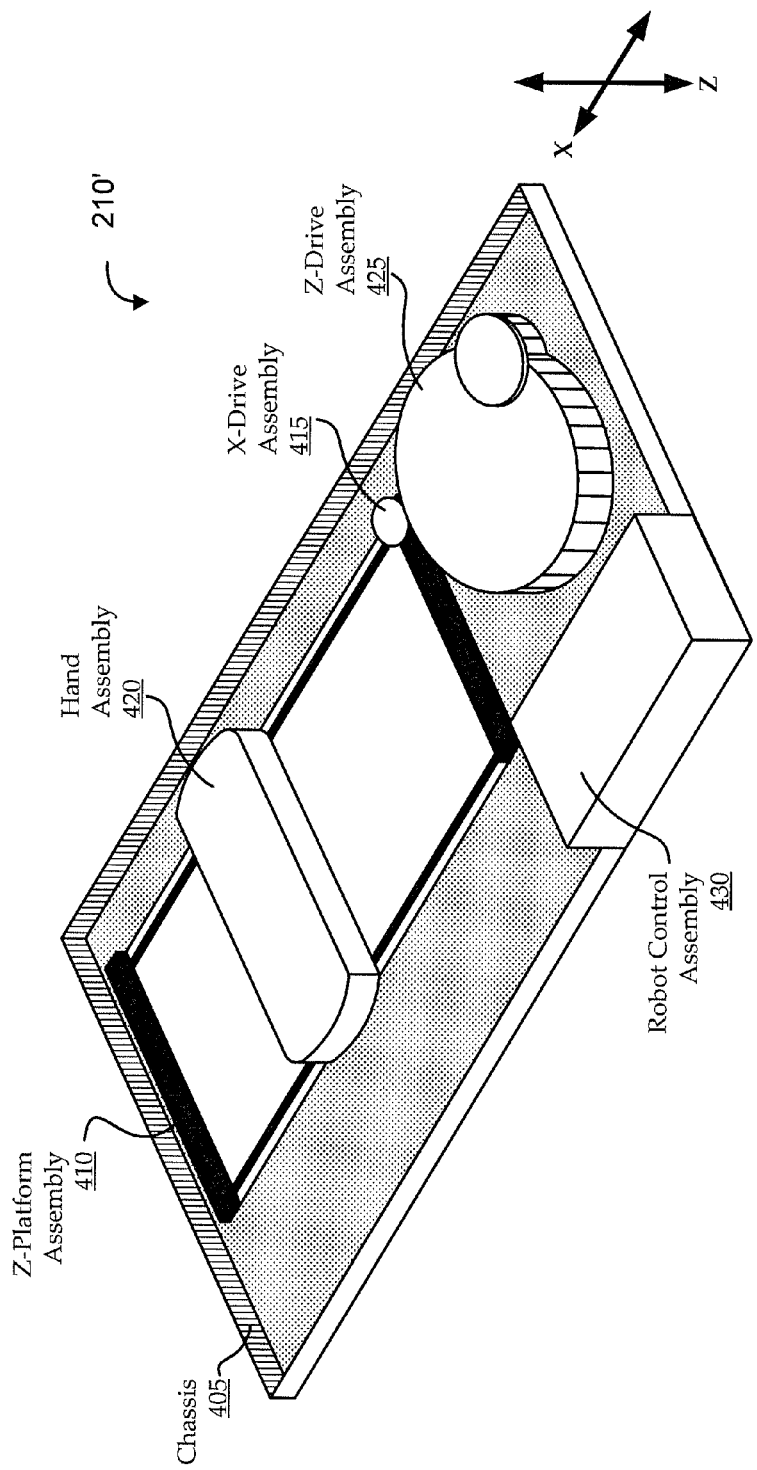
FIG. 4A shows a view looking down on the underside of an illustrative robot CRU (customer replaceable unit), according to various embodiments.
Figure 4B:
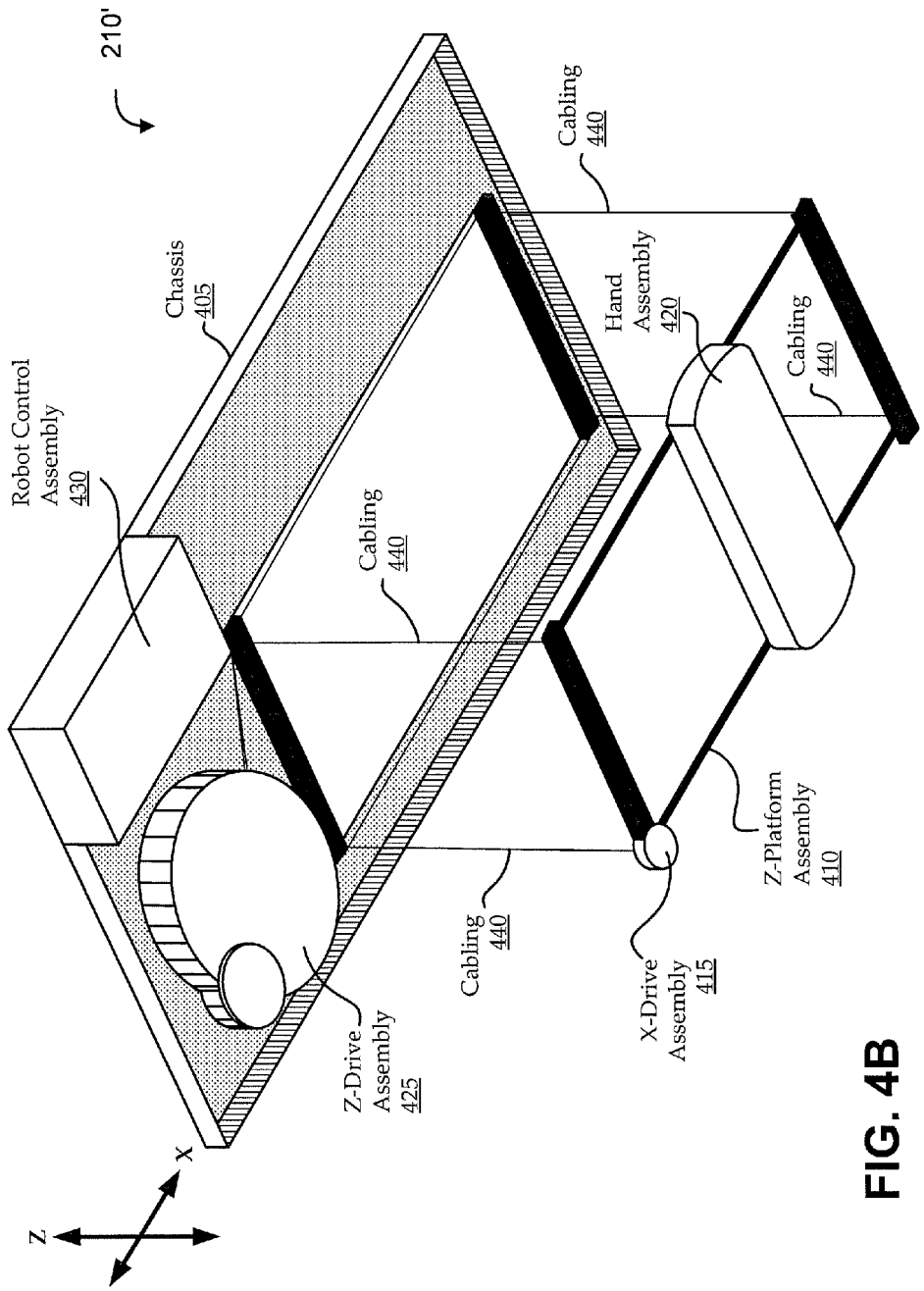
FIG. 4B shows another view looking up at the underside of an illustrative robot CRU with the Z-platform assembly partially lowered, according to various embodiments.

Much of the functionality of storage systems, like those discussed above with reference to FIGS. 1-3B, is facilitated by the robotic mechanism. As discussed above, the robotic mechanism is used to locate cartridges and ferry them between magazine slot locations and media drives. FIGS. 4A and 4B illustrate two views of an illustrative robot mechanism implemented as part of a robot CRU 210. The illustrations and descriptions of the robotic mechanism are highly simplified and represent only on possible type of implementation. Accordingly, they are intended only to add clarity and context and should not be construed as limiting the scope of the invention.

Turning to FIG. 4A, a view is shown looking down on the underside of an illustrative robot CRU 210', according to various embodiments. The robot CRU 210' may be an implementation of the robot CRU 210 of a base module 110, as discussed with reference to FIG. 2A. The robot CRU 210' includes a chassis 405 that houses a Z-platform assembly 410, an X-drive assembly 415, a hand assembly 420, a Z-drive assembly 425, and a robot control assembly 430.

In the implementation shown, the robotic mechanism is configured to move from its "home" position in the robot CRU 210' of the base module 110' down and/or over to any magazine 145 slot or drive in the base module 110' or an expansion module 120'. To accomplish this type of motion, the hand assembly 420 of the robotic mechanism moves in at least a "Z" direction (for the sake of FIGS. 4A and 4B, the +Z-direction is up towards the home position in the robot CRU 210, and the −Z-direction is down towards the bottom-most magazine slots of the bottom-most expansion module 120') and an "X" direction (for the sake of FIGS. 4A and 4B, the +X direction is towards the front side of the base module 110' or expansion modules 120', and the −X direction is towards the rear side of the base module 110' or expansion modules 120').

The hand assembly 420 is coupled with the Z-platform assembly 410, which can be moved in the Z-direction (i.e., raised and lowered) by the Z-drive assembly 425. The hand assembly 420 is also able to move along the Z-drive assembly 425 in the X-direction by the X-drive assembly 415 (e.g., along rails that are substantially perpendicular to the Z-directional axis). The Z-drive assembly 425 and X-drive assembly 415 may include any hardware for providing the desired movements, such as cables, gears, belts, rails, wheels, bearings, etc. Embodiments provide other types of motion in other ways. Some embodiments of the hand assembly 420 are coupled to the Z-platform assembly 410 via a "wrist" mechanism (e.g., shown as axis 650 of FIG. 6B below) that provides motion in a yaw direction (i.e., around the Z-directional axis). Some embodiments of the hand assembly 420 further provide radial movement from the Z-directional axis. For example, a grabber mechanism can "reach out" in a radial direction that is determined by the yaw (rotational) orientation provided by the wrist mechanism.

These various types of motion of the robotic mechanism, as well as other functionality of the robotic mechanism, are handled at least in part by the robot control assembly 430. Embodiments of the robot control assembly 430 are effectively the "brains" of the robotic mechanism, including electronic components used to store calibration information for the robotic mechanism, control movements of the robotic mechanism, read and/or decipher sensor information retrieved from the robotic mechanism, etc. For example, if data from a particular cartridge is desired, the robot control assembly 430 may direct the robotic mechanism to move to the magazine slot associated with that cartridge, verify presence of the cartridge, retrieve the cartridge from the magazine, ferry the cartridge to a drive, and release the cartridge into the drive.

For added clarity, FIG. 4B shows another view looking up at the underside of an illustrative robot CRU 210' with the Z-platform assembly 410 partially lowered, according to various embodiments. As illustrated, the Z-platform assembly 410 may not have a solid platform, and may instead be implemented as a carriage having a number of structural members (e.g., rails, supports, etc.). In the particular embodiment shown, the Z-drive assembly 425 includes motors and gearing that drive a bullwheel. The Z-platform assembly 410 is coupled with the bullwheel using a cable and pulley system. For example, cabling 440 is attached at each corner of the Z-platform assembly 410. The four cables 440 pass through pulleys and wrap around the bullwheel. Turning the bullwheel in one direction or the other adds slack to, or removes slack from, the cables 440, causing the Z-platform assembly 410 to be raised or lowered. Once in its desired Z-position (or while moving to that position), the X-drive assembly 415 can be used to move the hand assembly 420 (e.g., along rails of the Z-platform assembly 410) to a desired X-location. Once in its desired X-Z-position (or while moving to that position), the hand assembly 420 can be turned (e.g., using a wrist mechanism) to a desired rotational orientation (e.g., to face a cartridge slot or a media drive, to provide a desired angle for use of a sensor, etc.). If desired, a gripper mechanism may then be used to reach out (i.e., radially) from that X-Z-position and rotational orientation (e.g., to grab or release a cartridge).

It will be appreciated that the Z-drive assembly 425, the X-drive assembly 415, and other mechanisms are configured to move the hand assembly 420 to desired locations around the data storage system. In many cases, it is desirable to accurately position the hand assembly 420 and/or to accurately know the position of the hand assembly 420. For example, components of the hand assembly 420 can be used for calibration, targeting, location, pick and place operations, empty cell detection, barcode reading, feature identification, etc. Some or all of these uses involve knowing the location of one or more components of the hand assembly 420 in context of one or more features or components of the data storage system.

Embodiments described herein include one or more spot scanners integrated with the hand assembly 420. It will be appreciated that, while these embodiments are described with reference specifically to a hand assembly 420, much of the functionality of the spot scanners uses the hand assembly 420 as a carriage. Accordingly, similar or identical techniques can be applied in other environments having a carriage (e.g., regardless of whether other functions of the hand assembly 420 are present) without departing from the scope of the embodiments. As such, specific references to the hand assembly 420 and/or other components specific to the data storage system are intended only to provide context and should not be construed as limiting the scope of the embodiments.

As will be described more fully below, embodiments use multiple spot scanners in novel ways to acquire topographic and/or contrast information in multiple locations and/or across an extended scan region. For example, the hand assembly 420 can be used as a carriage to sweep multiple spot scanners concurrently across respective scan windows to record multiple, two-dimensional or three-dimensional topographic and/or contrast profiles. The profiles can be interpreted to facilitate location, validation, and/or recognition of geometric features and/or symbols. In various implementations, the information can then be fed forward (e.g., for location or identification of a media cartridge, carriage slot location, media drive slot location, etc.) or fed back (e.g., for location of the hand assembly 420 or spot scanner itself). By having the multiple scanners in fixed locations relative to each other, profiles can be registered to each other, multiple regions can be profiled more efficiently, different types of scanning can be performed concurrently, a larger effective scan region can be realized, and/or other functionality can be provided.

Figure 5:
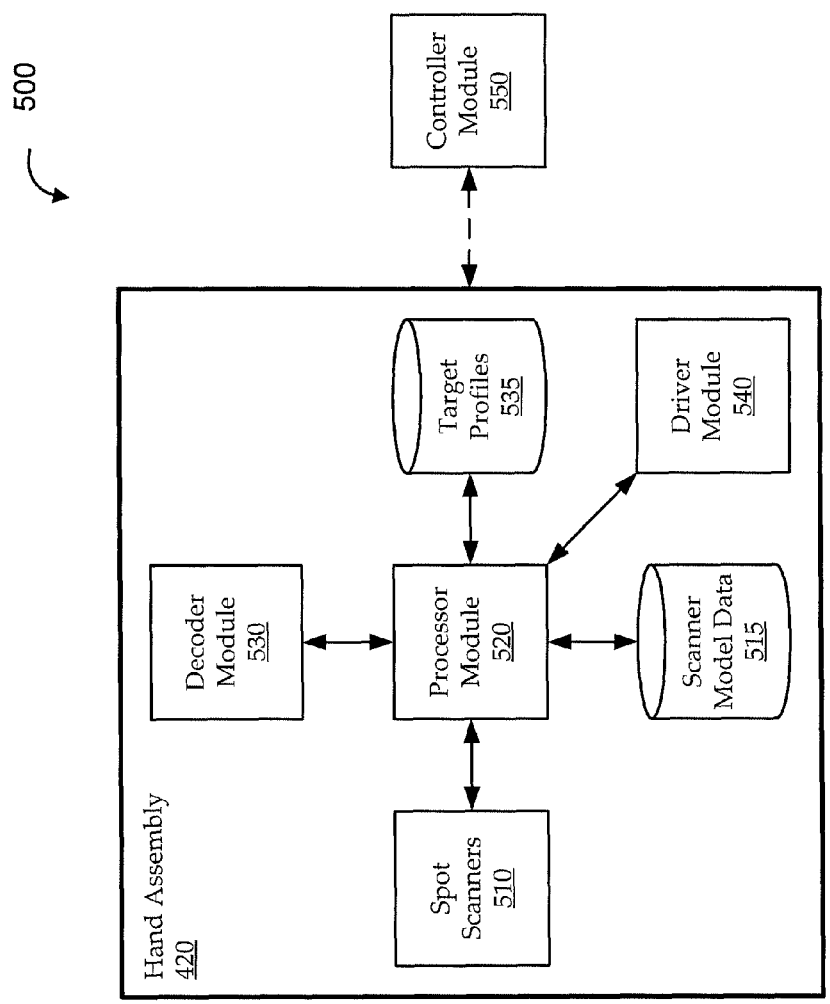
FIG. 5 shows a simplified block diagram that includes an illustrative hand assembly 420, according to various embodiments.

FIG. 5 shows a simplified block diagram 500 that includes an illustrative hand assembly 420, according to various embodiments. The hand assembly 420 has a number of functional blocks, including multiple scanners 510, a processor module 528, decoder module 530, a driver module 540, and one or more data stores. For example, as illustrated, the hand assembly 420 can include a scanner model data store 515 and a target profile data store 535. In some embodiments, the hand assembly 420 is in communication with a controller module 550. For example, the controller module 550 is the main processor of the data storage system, or any other controller external to, or integrated with, the hand assembly 420 or the robotic mechanism. In some implementations, some or all of the processing functionality is removed from the hand assembly 420. For example, the processor module 520 and/or the decoder module 530 can be implemented as functionality of the controller module. Further, any or all of the processor module 520, decoder module 530, and controller module 550 can be implemented in hardware and/or software, according to various embodiments. For example, the functionality of those component blocks can be implement it as instructions (e.g., software, firmware, etc.) that cause one or more processors of the data storage system, when executed, to implement the respective functionality.

As discussed above, the hand assembly 420 can be used as a carriage for the spot scanners 510. For example, movement of the hand assembly 420 in a Z-direction, in an X direction, in a rotational direction (e.g., using a wrist mechanism), etc. can be used to effectively move and/or point the spot scanners 510 at a desired location. While the hand assembly 420 may perform other functions, the description focuses on functions and components of the hand assembly 420 that relate to or facilitate spot scanner functionality for the sake of clarity. In some implementations, the spot scanners 510 are integrated into the hand assembly 420 in such a way as to have a fixed position and/or orientation with respect to the position and/or orientation of the hand assembly 420 (and/or with respect to other spot scanners 510 or other components). Accordingly, moving the hand assembly 420 in an X direction can sweep the spot scanners 510 in the X direction, and rotating the hand assembly 420 can change the direction in which the spot scanners 510 are pointing.

Embodiments of each spot scanner 510 are implemented as a zero-dimensional scanner component. For example, some implementations of the spot scanner 510 include a vertical-cavity surface-emitting laser (VCSEL), which has a transmitting element and a receiving element. The transmitting element transmits an optical signal that reflects off of a surface and is received by the receiving element. Characteristics of the received signal (e.g., the timing and/or amplitude of the signal) can be used to determine proximity to the surface, color of the surface, and/or other features. It will be appreciated that, as used herein, phrases like "spot scanner" or "zero-dimensional scanner" are intended to generally describe a category of scanning components that transmit in a spot-like manner, as opposed to one-dimensional scanners (e.g., line scanners, barcode scanners, etc.) or higher dimensional scanners. For example, a transmitting element of a spot scanner may effectively generate a spot-like output, even in implementations where multiple transmission elements are used.

Embodiments of the spot scanner 510 can be configured according to a number of scanner settings. In various embodiments, the scanner settings can include default settings, settings recorded during manufacturing and/or calibration, settings adjusted for particular tasks, etc. For example, the spot scanner can be adjusted to physically move at different speeds, to sample data at different sampling rates, to begin sampling at a particular point after the scanner begins to move (referred to herein as a "trip point"), to begin sampling at a particular horizontal location, to begin scanning at a particular vertical location, to follow a particular two-dimensional scanning path, to point the scanner at a particular angle with respect to the scan direction (e.g., a non-orthogonal angle), to change the transmission intensity and/or color, etc. It will be appreciated that some of these scanner properties are properties of the spot scanner 510 itself, while others of the scanner properties affect how the spot scanner 510 is used. For example, adjusting the speed at which the scanner moves may, in fact, involve adjusting the speed at which the hand assembly 420 is driven by the driver module 540 in a particular direction. Similarly, adjustments to sampling rates, and the like, may be implemented as adjustments to functions of the processor module 520, the decoder module 530, or another functional component.

In some embodiments, the driver module 540 is used to move and/or orient (e.g., rotate) the hand assembly 420, thereby moving and/or orienting the spot scanners 510. In this way, the spot scanners 510 can be swept across multiple scan windows to record scan data in one, two, or three dimensions. In one illustrative use case, the spot scanners 510 are swept across the scan windows in a substantially linear direction to obtain profile data (e.g., color or depth information) in one dimension. In another illustrative use case, the spot scanners 510 are swept across the scan windows multiple times (e.g., at different Z-positions) and/or along the two-dimensional path to obtain contrast data into dimensions. In yet another illustrative use case, the spot scanners 510 are swept across the scan window in a substantially linear direction to obtain topographic data (e.g., depth information) as a two-dimensional topographic profile. In still another illustrative use case, the spot scanners 510 are swept across the scan window in two dimensions (e.g., at multiple Z-positions, along the two-dimensional path, etc.) to obtain topographic data as a three-dimensional topographic profile.

Embodiments of the decoder module 530 are used to decode the scan data acquired by the spot scanners 510. For example, the decoder module 530 receives raw contrast data and/or raw topographic data from each spot scanner 510 and generates a contrast profile and/or a topographic profile of a region of each respective scan window therefrom. In some implementations, the raw data is a set of voltage levels mapped against one or more times or positions. The decoded data can be used in various ways to provide different types of functionality. In one illustrative use case, decoded scan data is used to identify an edge the geometric feature, the start of the barcode, a particular symbol, etc. In another illustrative use case, a contrast profile generated by the decoder module 530 is used to recognize a barcode or other symbol. In yet another illustrative use case, a topographic profile generated by the decoder module 530 is used to locate a geometric feature or is compared to a model profile to identify a geometric feature. For example, various types of targets may exist in the context of the data storage system, including magazine targets, access port targets (e.g., targets on a mail slot), media drive targets, media cassette targets, in the like. Each of these target types may have one or more associated geometric characteristics, including, for example, a target height, a target width, a target depth, a target focus distance, a target surface texture parameter, a target color parameter, a target scheme (e.g., dark-light-dark, light-dark-light, etc.), etc. By comparing the topographic profile to geometric characteristics of one or more target types, the scan data can be used to identify the target type, to locate the target, to validate the target, etc.

Various types of data can be stored in data stores (e.g., volatile and/or nonvolatile storage) to facilitate various scanner functions. In some embodiments, decoded scan data (e.g., contrast and/or topographic profiles generated by the decoder module 530) is stored in a target profile data store 535. Various embodiments store scanner settings, target types, target models (e.g., geometric characteristics of various target types), and/or other data in the scanner model data store 515. The data stores may be implemented as part of the hand assembly 420, in storage systems or components in communication with the hand assembly 420, or in storage systems or components in communication with the processor module 520, the controller module 550, or another processing component.

Embodiments of the processor module 520 can be used to direct (e.g., instruct, coordinate, interpret, etc.) functions of the other functional blocks. For example, the processor module 520 may direct the driver module 540 to sweep the spot scanners 510 across the scan window to acquire scan data. The processor module 520 can facilitate communication of the scan data to the decoder module 530, for example, at a particular sampling rate, using a particular protocol, etc. The processor module 520 can further direct the decoder module 530 to decode the scan data and to generate one or more target profiles. The target profiles can be stored by the processor module 520 in the target profile data store 535, further processed (e.g., validated against, interpreted according to, etc.) according to data from the scanner model data store 515.

Figure 6A:
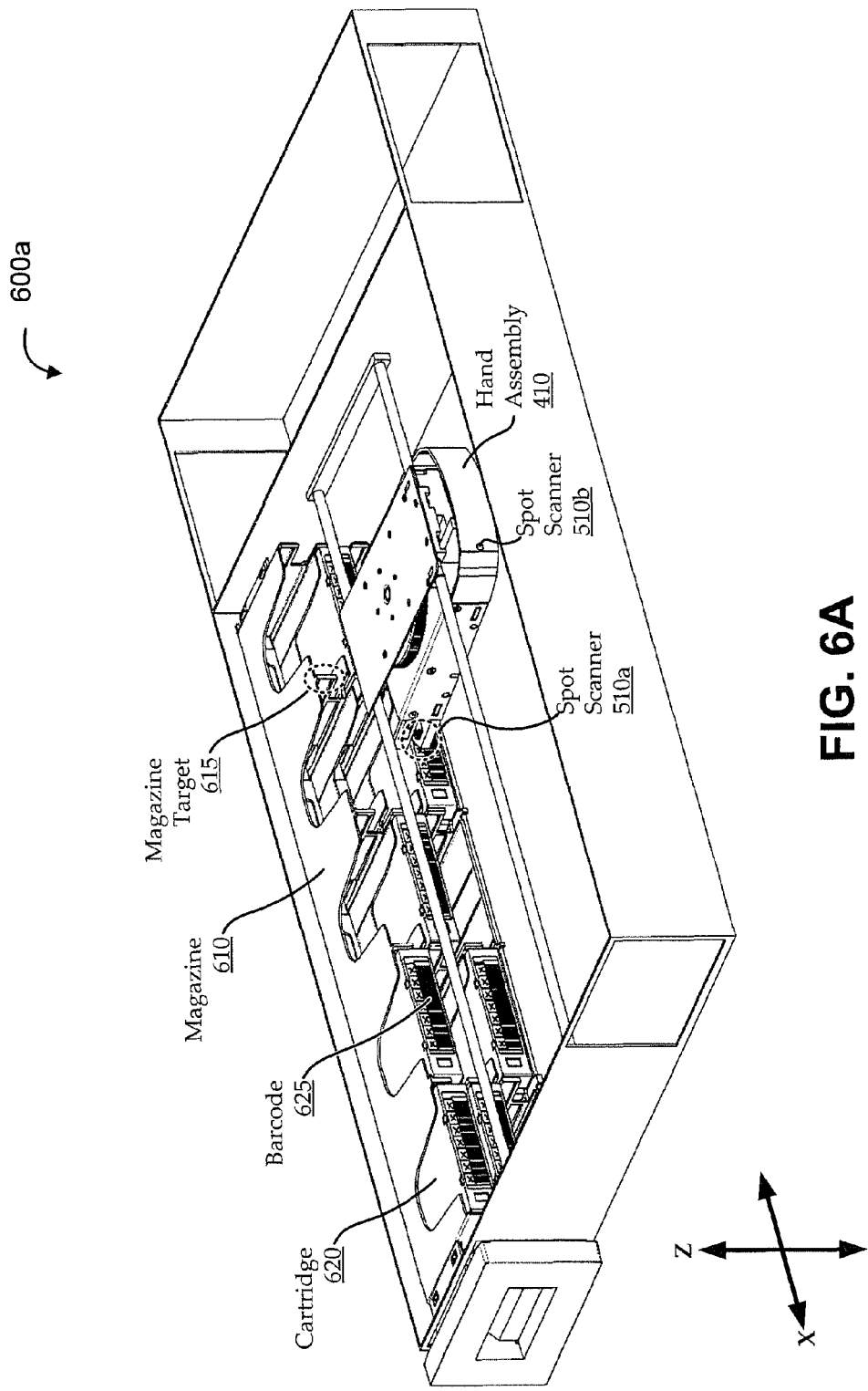
FIG. 6A shows an illustrative module (e.g., a robot CRU) configured to provide spot scanner functionality, according to various embodiments.

For the sake of adding clarity, FIG. 6A shows an illustrative module 600a (e.g., robot CRU 210) configured to provide spot scanner functionality, according to various embodiments. The illustrative module 600a includes a hand assembly 410 that has two spot scanners 510. Alternative embodiments have a single spot scanner 510 or more than two spot scanners 510. As illustrated, the hand assembly 410 is oriented in such a way that one of the spot scanners 510a is pointing toward a magazine 610. The magazine 610 includes a number of magazine targets 615 and media cartridges 620. Each media cartridge 620 is installed in an indexable slot location of the magazine 610. The media cartridges 620 are shown as having barcode 625 labels. Barcodes 625 or other techniques can be used to identify a particular media cartridge (e.g., identify its content by its label).

Embodiments are configured so that the hand assembly 410 can move in at least an X-direction (e.g., horizontally with respect to the magazine 610) and a Z-direction (e.g., vertically with respect to the magazine 610). In some embodiments, the hand assembly 410 is further configured to rotate about an axis. As described more fully below, embodiments are configured to use the spot scanners 510 to provide various types of functionality, including, for example, targeting, location, identification, etc. For example, sweeping the spot scanner 510 across a scan window in the vicinity of the magazine target 615, topological data can be gathered for use in locating and/or identifying the magazine target 615; and sweeping the spot scanner 510 across a scan window in the vicinity of the barcode 625, contrast data can be gathered for use in identifying an associated cartridge 620.

Figure 6B:
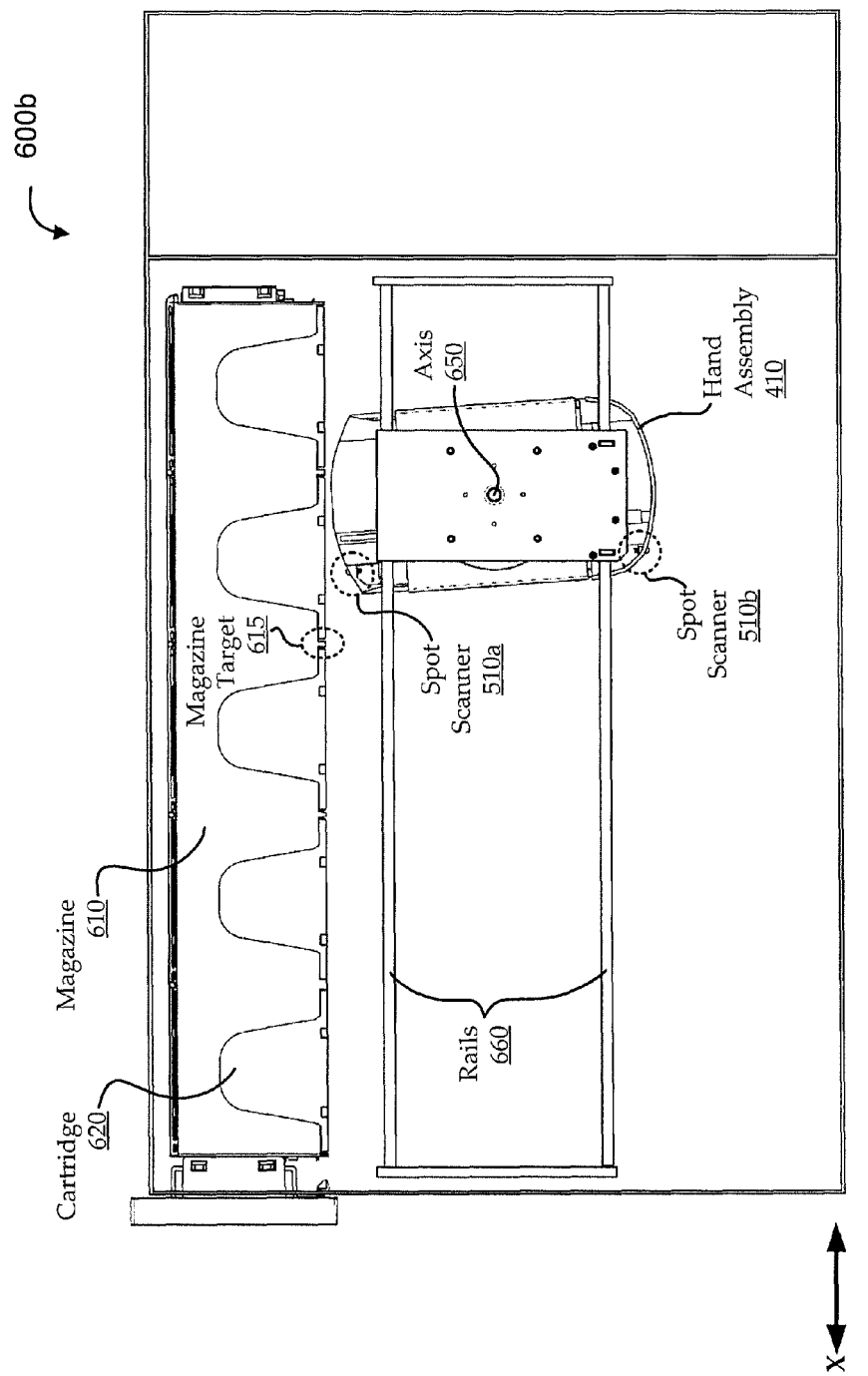
FIG. 6B shows a top-down view of an illustrative module, which may be another view of module of FIG. 6A.

FIG. 6B shows a top-down view of an illustrative module 600b, which may be another view of module 600a of FIG. 6A. As illustrated, the hand assembly 410 is oriented in such a way that the spot scanners are pointing at an angle with respect to primary target surfaces (i.e., the scan angle or detection direction is substantially non-orthogonal to the target surface and to the scan direction). By moving the hand assembly 410 along the rails 660 (i.e., in the X-direction) and/or by rotating the hand assembly 410 around axis 650, the spot scanners 510 can be positioned and/or the detection direction can be selected as desired.

FIG. 7 shows a close-up view 700 of a partial module environment, such as within module 600 of FIG. 6A or 6B. As illustrated, the hand assembly 410 is positioned so that it spot scanner 510 is directly adjacent to (i.e., pointed at, positioned next to, etc.) a barcode 625 on a media cartridge 620. The cartridge 620 is installed in a magazine 610. As discussed above, magazine targets 615 are integrated into the magazine 610, for example, to assist with location, targeting, etc. using topological scanning techniques. The spot scanner 510 can also be swept across the barcode 625 and can acquire contrast data for use in interpreting the barcode 625. It will be appreciated that many types of targets (e.g., magazine target 615) and/or many types of identifiers (e.g. barcode 625) can be located and/or recognized using various functionality provided by the spot scanner 510.

FIGS. 8A-8C show simplified views 800 of an illustrative spot scanner 510 implemented as a VCSEL pointing at different scan angles 845, according to various embodiments. Turning first to FIG. 8A, the spot scanner 510 is shown pointing directly at a target 810. The target may, for example, be one of the magazine targets 615 shown in FIG. 6. The spot scanner 510 is implemented as a VCSEL that has a spot scanner transmitter 830 any spot scanner receiver 840 noted on a circuit board 820. Though not shown, the spot scanner 510 may be integrated with a carriage (e.g., hand assembly 410) configured to move the spot scanner 510 in the scan direction 855 and to rotate the spot scanner 510 to point at different angles relative to the target 810.

The spot scanner 510 is configured to transmit radiation (e.g., an optical signal) from the spot scanner transmitter 830 in a transmission direction and to receive radiation reflected from the target 810 at the spot scanner receiver 840. As used herein, the "scan angle 845" is the angle between the scan direction 855 and the direction in which the spot scanner 510 is pointing. For example, in FIG. 8A, the spot scanner 510 is pointing in a direction that is substantially orthogonal to the scan direction 855 (e.g., which may be substantially normal to a target 810 surface). Accordingly the scan angle 845a may be referred to as 90-degrees, or alternatively, as zero-degrees out of orthogonal with the scan direction.

It is worth noting that, in a VCSEL, the spot scanner transmitter 830 (and sometimes the spot scanner receiver 840) is typically angled so that the transmission direction is not parallel to the direction in which the spot scanner 510 is pointing. This difference between the transmission direction and the direction in which the spot scanner 510 is pointing is illustrated as internal angle 835. Because of the internal angle 835, the scan angle 845 may be different from the angle at which radiation is being directed at the target 810 surface. Accordingly, the effective angle at which the target 810 surface is being detected (referred to herein as the "detection angle 865") is different from the scan angle 845 by the value of the internal angle 835. For example, if the internal angle 835 is approximately four-degrees, and the scan angle 845 is approximately 90-degrees, the detection angle 865 is approximately 86-degrees (or 94-degrees, depending on the convention used).

As such, maximum illumination of a surface that lies substantially in the scan direction 855 may be achieved by adjusting the scan angle 845 to account for the internal angle 835 so that the detection angle 865 is substantially orthogonal to the scan direction 855. This is the condition illustrated in FIG. 8B. As shown, the spot scanner 510 is rotated counter-clockwise to account for the internal angle 835, such that the scan angle 845b is no longer orthogonal to the scan direction 855, but the detection angle 865b is orthogonal to the scan direction 855. For example, if the internal angle 835 is approximately four-degrees off-orthogonal in a clockwise direction, and the spot scanner 510 is rotated by four-degrees in a counter-clockwise direction; the detection angle 865 becomes approximately 90-degrees, and the scan angle 845 becomes approximately 86-degrees (or 94-degrees, depending on the convention used). With this spot scanner transmitter 830 effectively pointing directly at the target 810 surface, this configuration may provide maximum illumination to the surface.

Different results can be achieved by pointing the spot scanner 510 at other scan angles 845. Turning to FIG. 8C, the spot scanner 510 is shown rotated in a clockwise direction. In this configuration, the detection angle 865c is further off-orthogonal, such that a greater amount of radiation may be deflected away from the receiver 840. Such a configuration may be useful in instances where it is desirable to reduce elimination of the surface, for example, in order to reduce glare in high-reflectivity environments. As described above, embodiments use the spot scanner 510 for both topographic and contrast scanning functions. In some embodiments, it is desirable to maximize illumination of the surface for topographic scanning and to minimize illumination of the surface for contrast scanning. It will be appreciated from the preceding description that even small changes to the scan angle 845 (e.g., by adjusting the wrist angle of the hand assembly 410 to change angle in which the spot scanner 510 is pointing) can appreciably affect the extent at which a target 810 surface is illuminated.

Figure 9A:
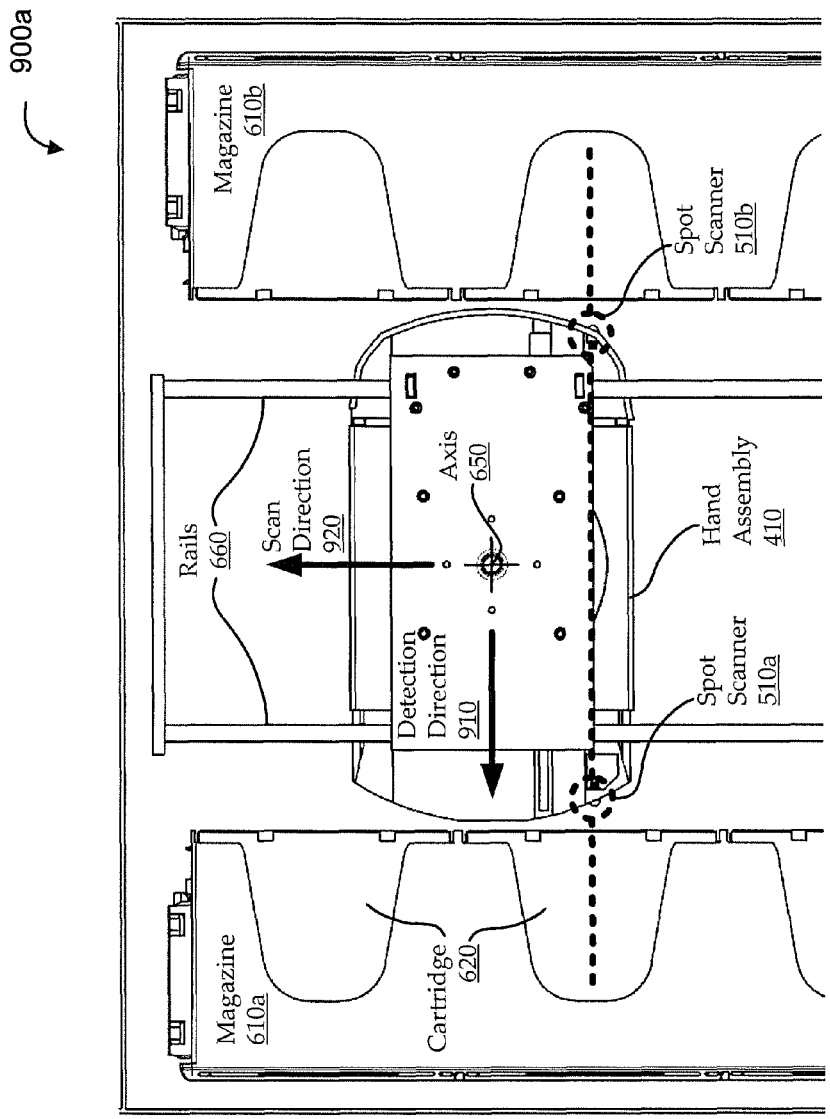
FIGS. 9A and 9B show a top-down view and a side view, respectively, of an illustrative module, which may be another implementation of module of FIGS. 6A and 6B, but with two magazines located opposite each other in the module.
Figure 9B:
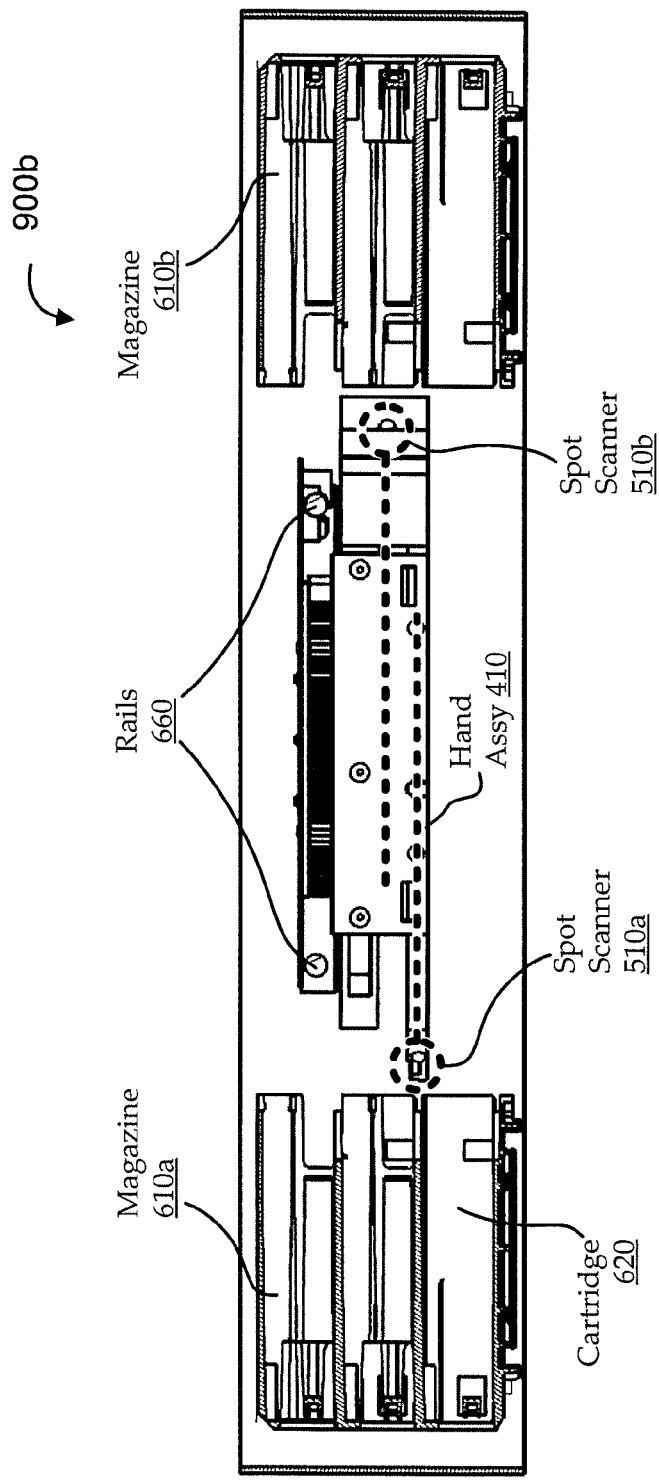

FIGS. 9A and 9B show a top-down view and a side view, respectively, of an illustrative module 900, which may be another implementation of module 600 of FIGS. 6A and 6B, but with two magazines 610 located opposite each other in the module 900. FIGS. 9A and 9B will be discussed in parallel to more clearly describe certain tandem spot scanning functions (i.e., those functions facilitated by having multiple spot scanners 510. A scan direction 920 and a detection direction 910 are illustrated. The hand assembly is illustrated as pointing directly at the magazines 610, so that the scan direction 920 and the detection direction 910 are substantially perpendicular. As discussed above, while the hand assembly 410 is illustrated as pointing straight-ahead at the magazines 610, the hand assembly may be rotated so that the spot scanners 510 are pointing at one or more angles with respect to target surfaces (i.e., so that the detection direction 910 substantially non-orthogonal to the target surface and to the scan direction 920). By moving the hand assembly 410 along the rails 660 (i.e., in the scan direction 920) and/or by rotating the hand assembly 410 around axis 650, the spot scanners 510 can be positioned and/or the detection direction 910 can be selected as desired.

As illustrated, the multiple spot scanners 510 can be located (e.g., positioned, oriented, etc.) so as to provide additional functionality. According to one set of functionality, multiple spot scanners 510 are positioned on the hand assembly 410 to allow efficient (e.g., space efficient) access to the full extents of the magazine slot locations. For example, as illustrated in FIG. 9A, the two spot scanners 510 are both located to one side of the hand assembly 410. By orienting the hand assembly 410 as shown, the first spot scanner 510a can be positioned adjacent to one and of the magazine 610. By rotating the hand assembly 410 by 180-degrees, and moving the hand assembly 410 all the way to the other end of the magazine 610, the second spot scanner 510b can be positioned adjacent to the other end of the magazine 610.

Similarly, as illustrated in FIG. 9B, the first spot scanner 510a and the second spot scanner 510b can be positioned at different Z-locations (e.g., so that one is "higher" than the other with respect to the magazine 610). In this way, it is possible to position one or the other spot scanner 510 at each vertical extent of the magazines 610. Notably, embodiments are able to scan across substantially the full extents of the desired area without having to point, tilt, or otherwise redirect the spot scanners 510 to undesirable scan angles. Further, embodiments are able to scan across substantially the full extents of the desired area without having to expand the dimensions of the sweep area to allow portions of the hand assembly to move appreciably past the desired target.

According to another set of functionality, multiple spot scanners 510 are used in tandem to concurrently acquire data. As illustrated in FIGS. 9A and 9B, some data storage environments have magazines 610 and cartridges 620 on both sides of the module 900 (e.g., the module 600 of FIGS. 6A and 6B can be considered as a different implementation having only one magazine 610 or as a use case of the module 900 in which only one of the two magazines 610 is currently installed). As the hand assembly 410 moves, the spot scanners 510 are each pointed at a magazine 610 on their respective sides of the module 900, and can be used together contrast and/or topological data in tandem. In one example, wall bar codes are being read using contrast scanning of cartridges 620 on one side of the module 900, various target locations are being audited (e.g., validated) using topologic scanning of magazine targets 615 on the opposite side of the module 900. In another example, topological maps of opposite sides of the module 900 are generated concurrently using topologic scanning by the two spot scanners 510 operating in tandem.

According to yet another set of functionality, multiple spot scanners 510 are used in tandem to facilitate additional or alternative registration techniques. In one illustrative use case, location of a geometric feature of one magazine 610a by one spot scanner 510a is used to register scanned profile data from the opposite magazine 610b collected using the other spot scanner 510b. For example, it may be more efficient and/or effective to locate geometric features using topographic profile data, and it may be more efficient and/or effective to decode label symbols using contrast profile data. Accordingly, the first spot scanner 510a can be used to collect topography data for location and registration of a contrast profile that is substantially concurrently collected by the other spot scanner 510b.

Figure 10A:
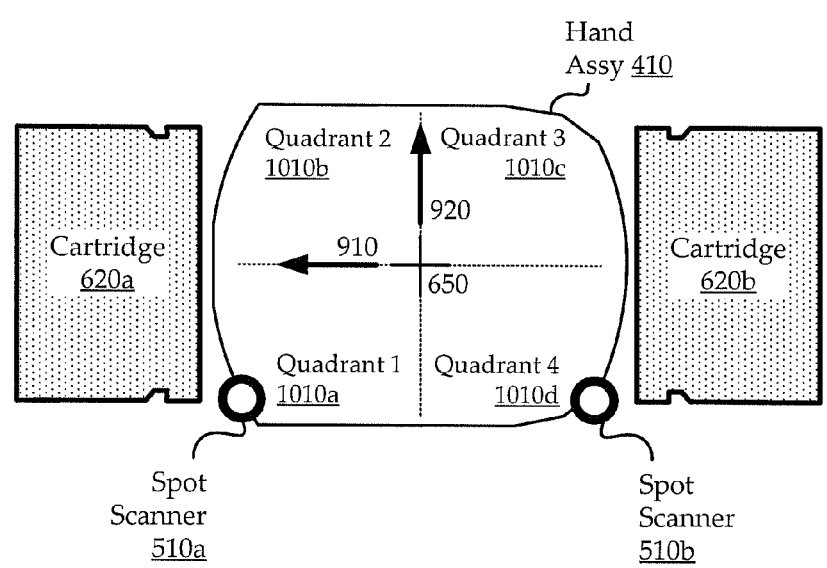
FIG. 10A shows a simplified view of a hand assembly in context of two cartridges.

This and other functionality is illustrated further in FIGS. 10A-10E. FIG. 10A shows a simplified view of a hand assembly 410 in context of two cartridges 620. As described above, the hand assembly 410 can move in a scan direction 920 and can rotate about an axis 650 to point one or more spot scanners 510 in a detection direction 910. When the detection direction 910 is perpendicular to the scan direction 920 (as shown), four quadrants 1010 of the hand assembly 410 can be defined. In the illustrated implementation, a first spot scanner is in a first quadrant 1010a, and a second spot scanner 510b is in a fourth quadrant 1010d.

Figure 10B:
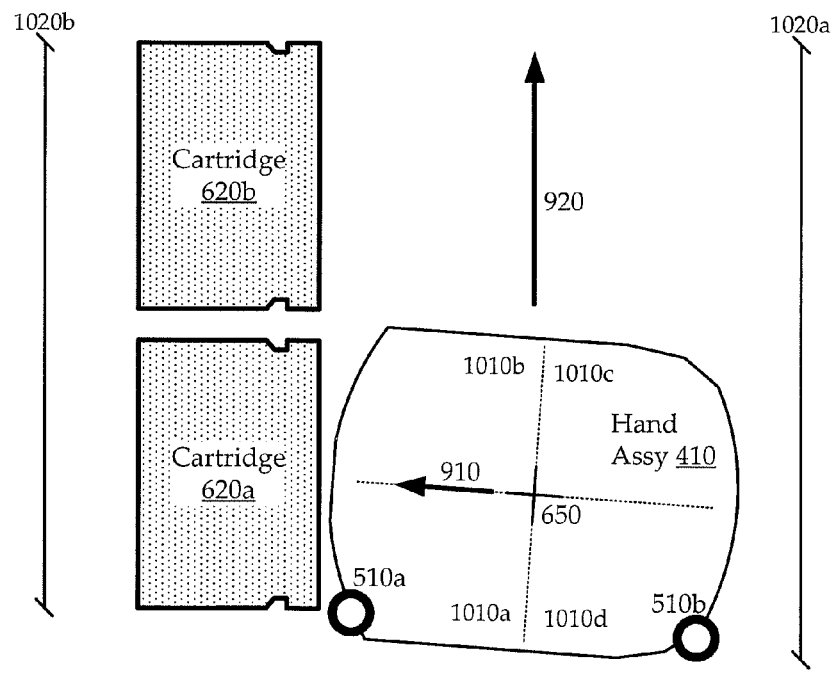
FIGS. 10B and 10C show an illustrative use case for a hand assembly, like the one illustrated in FIG. 10A.
Figure 10C:
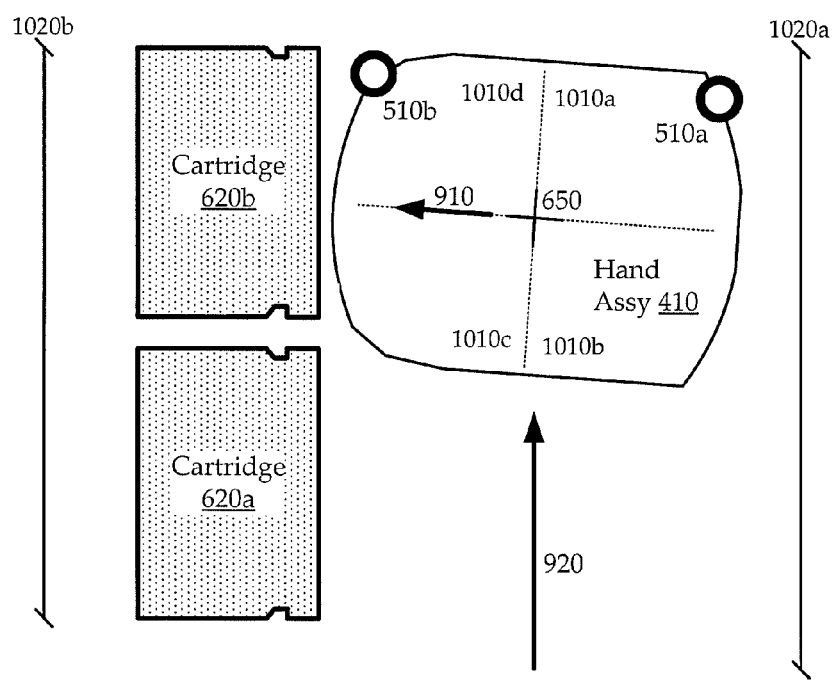

FIGS. 10B and 10C show an illustrative use case for a hand assembly 410, like the one illustrated in FIG. 10A. As illustrated in FIG. 10B, the hand assembly 410 is positioned at a first location and rotated about axis 650 so that the detection direction 910 is non-orthogonal to the scan direction 920. The first position is at one extent of a movement region 1020a (i.e., the full range of movement available to the hand assembly 410. As discussed above, this detection direction 910 may be the optimal direction for certain types of data acquisition (e.g., topography data or contrast data).

In this configuration, the first spot scanner 510a can be pointed at one extent of a scannable region 1020b in the desired (e.g., optimal) detection direction 910 while the carriage is positioned at the first extent of the movement region 1020a. It will be appreciated that, for the first spot scanner 510a to be able to point to the other extent of the scannable region 1020b in the desired detection direction 910, it may be necessary to appreciably expand the movement region 1020a.

As shown in FIG. 10C, however, the illustrated hand assembly 410 configuration allows desired access to the full scannable region 1020b without appreciably extending the movement region 1020a. By rotating the hand assembly 410 approximately 180 degrees about the axis 650, the second spot scanner 510b can be pointed in the same desired detection direction, but on the opposite side of the hand assembly 410. In this way, the second spot scanner 510b can be pointed at the other extent of the scannable region 1020b in the desired detection direction 910 while the carriage is positioned at the second extent of the movement region 1020a. In some implementations, this technique can be used so that the effective scannable region 1020b is substantially the same as the movement region 1020a.

Figure 10D:
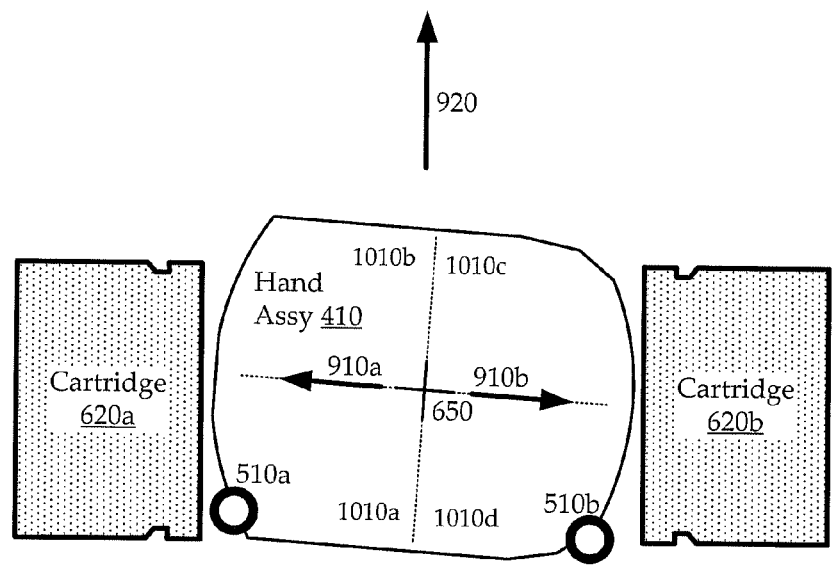
FIG. 10D shows another illustrative use case for a hand assembly, like the one illustrated in FIG. 10A.

FIG. 10D shows another illustrative use case for a hand assembly 410, like the one illustrated in FIG. 10A. As illustrated in FIGS. 10B and 10C, the hand assembly 410 is rotated about axis 650 so that the detection direction 910 is non-orthogonal to the scan direction 920. In FIG. 10D, the first spot scanner 510a is effectively pointed in a first detection direction 910a and the second spot scanner 510a is effectively pointed in a second detection direction 910b. As the hand assembly is moved in the scan direction 920, each spot scanner 510 is swept across a different scan window. In some embodiments, the orientation of the hand assembly 410 is such that the first detection direction is substantially the optimal direction for data acquisition with reference to a first set of target features (e.g., of cartridge 620a), and the second detection direction is substantially the optimal direction for data acquisition with reference to a second set of target features (e.g., of cartridge 620b).

As discussed above, the spot scanners 510 can be used independently to acquire scan data in multiple regions without having to rotate the hand assembly 410 to the same degree or as often. Alternatively, the spot scanners 510 can be used to acquire scan data concurrently from different scan windows. For example, a feature scanned by one spot scanner 510 can be used to locate or validate a feature scanned by the other spot scanner 510. Similarly, magazine locations on one side of a storage environment can be audited by one scanner while target features (e.g., magazine targets, labels, etc.) are scanned on an opposite side of the storage environment.

Figure 10E:
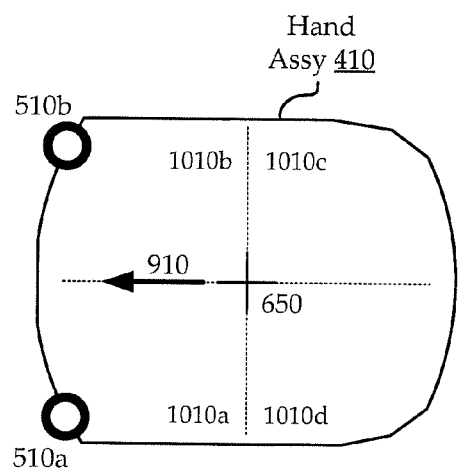
FIG. 10E shows an illustrative hand assembly having a first spot scanner in a first quadrant, and a second spot scanner in a second quadrant.

Other implementations are possible for providing other functionality. FIG. 10E shows an illustrative hand assembly 410 having a first spot scanner 510a in a first quadrant 1010a, and a second spot scanner 510b in a second quadrant 1010b. This configuration could be used, for example, to address issues discussed above with reference to FIGS. 10B and 10C. For the sake of illustration, the hand assembly 410 is moved in the scan direction 920 from a first movement extent to a second movement extent. When the hand assembly 410 is moved to the first movement extent, the first spot scanner 510a can acquire scan data at approximately the first movement extent while pointing in the optimal detection direction 910. When the hand assembly 410 is moved to the second movement extent, the second spot scanner 510b can acquire the raw scan data at approximately the second movement extent while still pointing in the optimal detection direction 910 (e.g., though potentially at a different focal distance from the target features).

Other configurations are possible. For example, the second spot scanner 510b could be located in the third quadrant 1010c. Alternatively, the spot scanners could be positioned using center lines of the hand assembly 410, rather than in quadrants 1010. In an alternative configuration to the one shown in FIGS. 10A-10C, the internal angles of the spot scanners 510 could be flipped, so that the optimal detection direction 910 for one spot scanner 510 is the mirror image of the optimal detection direction 910 for the other spot scanner 510. In that configuration, while one spot scanner 510 is pointed in a direction that is optimal for one type of data collection (e.g., topographic data acquisition), the other spot scanner 510 would be pointed in a direction that is optimal for another type of data collection (e.g., contrast data acquisition).

Still other implementations include more than two spot scanners 510. For example, multiple spot scanners 510 may be distributed in one or more quadrants 1010. In some embodiment, at least one spot scanner 510 is located in each of at least two quadrants 1010. In other embodiments, multiple spot scanners 510 are located at different Z positions in one or more quadrants 1010. For example, two spot scanners 510 can be positioned in substantially the same X-Y position, but at different Z positions (e.g., separated vertically by one inch). The two spot scanners 510 can be used to concurrently collect data from two labels in two vertical positions, or to provide other functionality.

Figure 11:
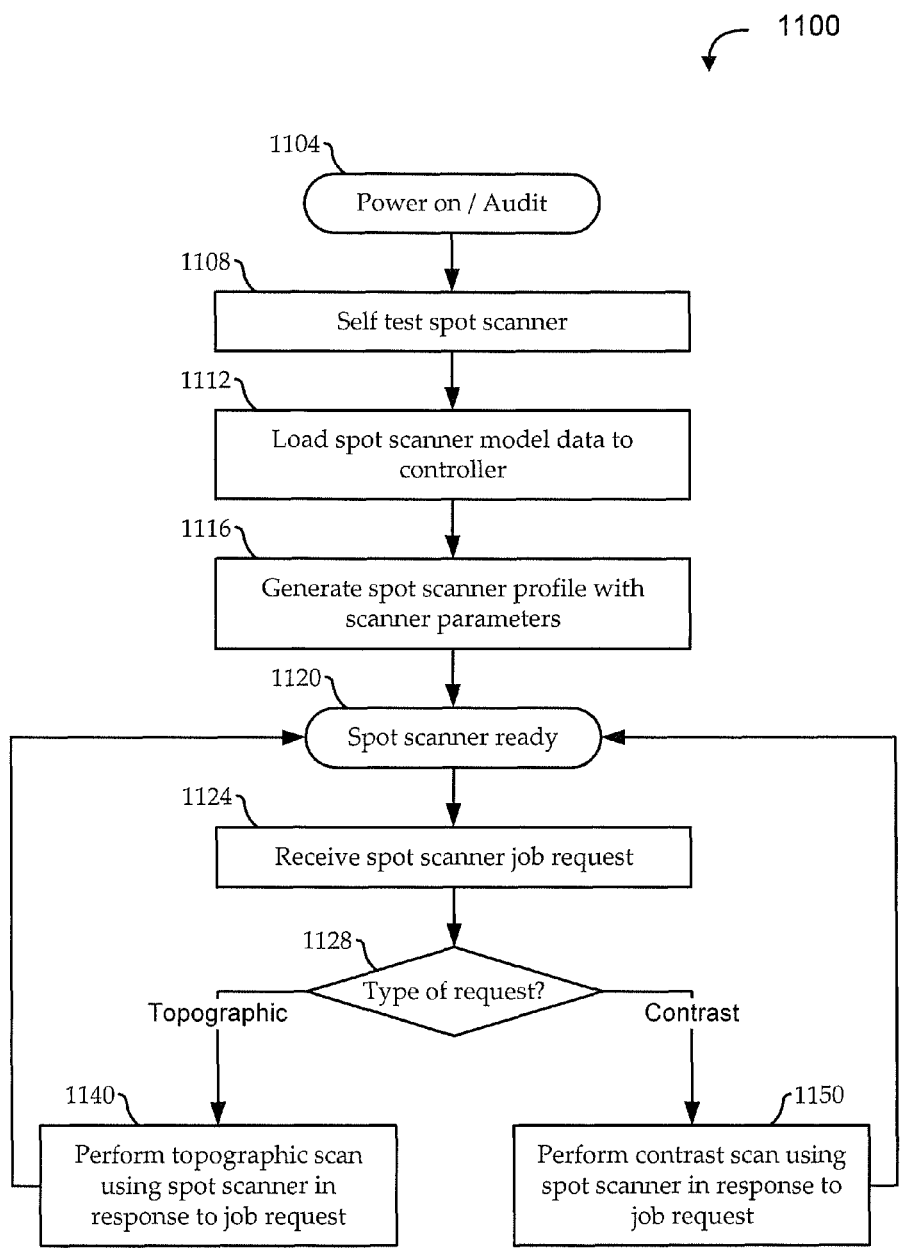
FIG. 11 shows a flow diagram of an illustrative method for using a spot scanner in a data storage system, according to various embodiments.

Turning to FIG. 11, a flow diagram is shown of an illustrative method 1100 for using a spot scanner in a data storage system, according to various embodiments. Embodiments begin at stage 1104 when a scan start-up sequence is initiated. In some embodiments, this occurs when the system is started up. During the start-up routine, the scanner may come online and may be used to run a calibration routine, an auditing routine, etc. Alternatively, one or more events may trigger a similar routine to run. For example, when the mailslot is removed and replaced, when any CRU is removed and replaced, when a diagnostic routine is initiated, when an audit routine is initiated, etc., a scanner routine may occur.

At stage 1108, the spot scanner may run through a self test routine. The routine may involve any steps for testing the functioning of the scanner. Some embodiments measure the internal reflectance of the scanner in free air to confirm that the scanner is operational. Other embodiments measure light-dark contrast, received signal amplitude, edge detection, and/or other functions with respect to a control surface or control geometric feature.

Spot scanner model data can be loaded (e.g., to the processor or controller) at stage 1112. This data may be stored, for example in firmware, in association with the particular spot scanner and/or with the spot scanner installation (e.g., the hand assembly with which the spot scanner is integrated), and the data may have been generated and stored as part of an initial calibration sequence. During manufacturing and assembly, parameters of the spot scanner can be measured, tested, recorded, etc. In one embodiment, the hand assembly is moved to a precise physical location and orientation, and a dual position sensor (DPS) is used to measure the precise location and orientation of the spot scanner. In this way, any minor variance in the location or orientation of the spot scanner relative to nominal values can be detected and recorded for later use in calibration. Similar physical calibration of the spot scanner can be performed using other techniques. For example, a "barn door" technique can be used by providing a reference opening of a particular location, width, etc., and sweeping the spot scanner across the opening to determine any difference between the expected and measured locations of the opening's features. Alternatively, the spot scanner position can be manually adjusted in certain implementations using adjustment features (e.g., screws, etc.) to make slight modifications to the position and/or orientation of the spot scanner. Any other useful data can be recorded for future calibration and the like. For example, embodiments can load data relating to internal reflectance of the spot scanner in free air, light-dark contrast volts, brightness quotient (e.g., a value that indicates the effective brightness of the scanner), noise signal (e.g., a jitter parameter), etc. In some implementations, a spot scanner profile is generated at stage 1116 according to the data from stages 1108 and 1112. For example, data generated in stage 1108 can be used to validate and/or adjust data read in at stage 1112.

Having initialized the scanner with its associated scanner properties, the scanner is now ready for use in providing scanning functionality at stage 1120. At stage 1124, a spot scanner job request is received. The request may be issued by a user of the data storage system. For example, a request to retrieve a media cassette may involve one or more uses of the scanner to help locate and/or identify the media cassette; or a request to run an audit routine may involve multiple uses of the scanner to target and/or validate locations, detect empty magazine cells, inventory installed media cassettes, etc. Alternatively, the request may be issued as part of an automated process, for example, as part of a periodic self-test or audit routine.

At stage 1128, a determination is made as to what type of request is received at stage 1124. As illustrated, embodiments may broadly classify requests as topography-related requests and contrast-related requests. Performance of stage 1128 may involve interpreting the request to determine whether it is topography-related or contrast-related. For example, a request to find and audit a magazine slot location may be interpreted as a topography-related request, while a request to identify a media cassette by its barcode may be interpreted as a contrast-related request. If it is determined at stage 1128 that the request is topography-related, one or more topographic scans may be performed using the spot scanner in response to the request at stage 1140. If it is determined at stage 1128 that the request is contrast-related, one or more contrast scans may be performed using the spot scanner in response to the request at stage 1150. Embodiments of topographic scans and contrast scans are described more fully below with reference to FIGS. 12 and 13, respectively.

Figure 12:
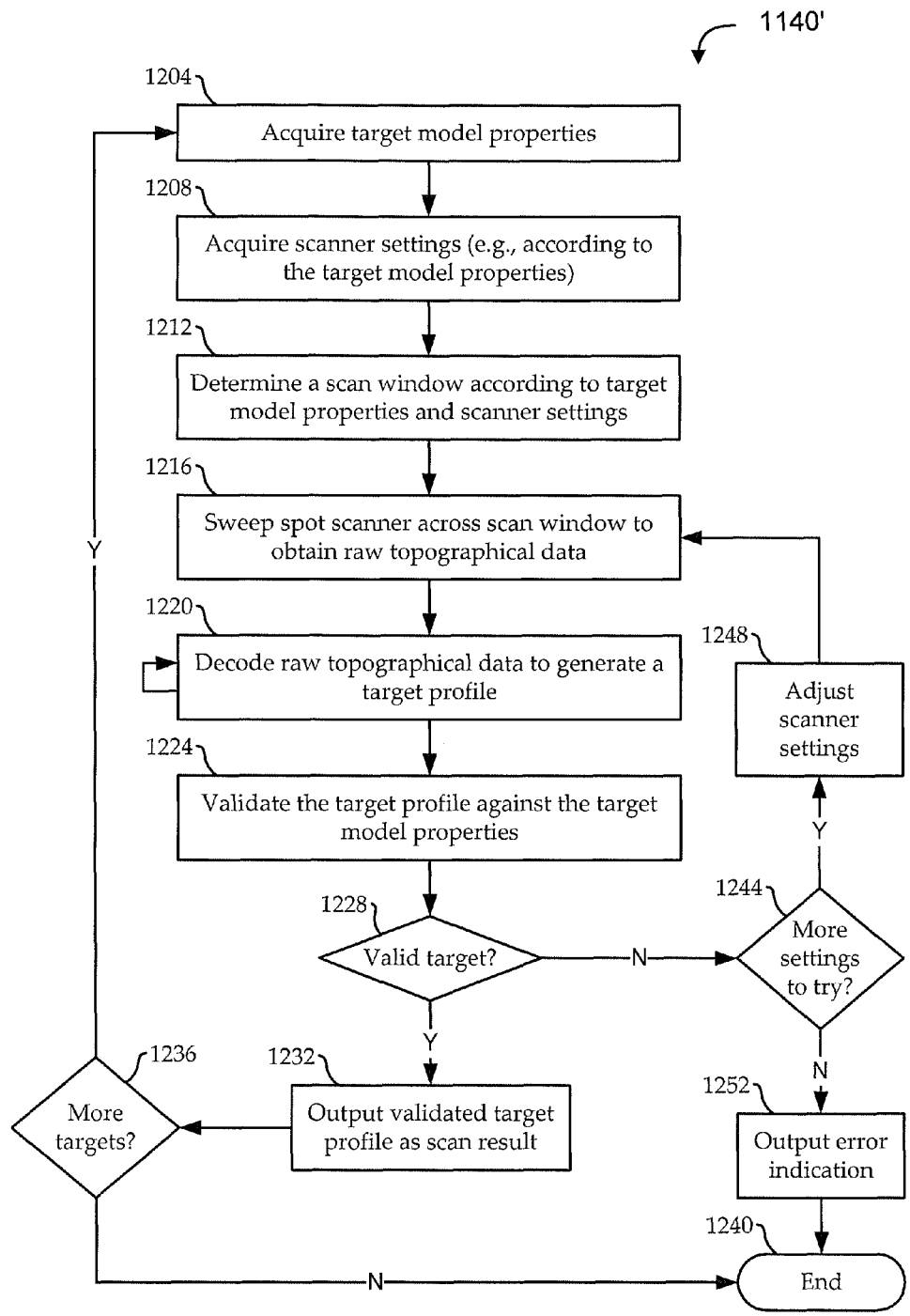
FIG. 12 shows a flow diagram of an illustrative method for performing topographic spot scanning, according to various embodiments.

FIG. 12 shows a flow diagram of an illustrative method 1140' for performing topographic spot scanning, according to various embodiments. The method 1140' may illustrate some embodiments of stage 1140 of FIG. 11. For example, a controller of the data storage system may direct scanning of some or all alignment targets in the system environment. Embodiments begin at stage 1204 by acquiring target model properties. The target model properties may include any useful data for modeling the targets, for example, including model target types, model target geometrical characteristics, model target locations, etc. In some embodiments, a cell map is maintained that includes the types and locations (e.g., target center or edge coordinates) for all targets in the data storage system. Various target types are possible, including, for example, magazine targets (e.g., targets integrated into the magazine design to help locate the hand assembly with respect to the magazine), access port targets (e.g., targets specific to the mail slot or other access ports of the data storage system), media drive targets (e.g., targets used to locate media drives, media drive slots, etc.), and/or others. Each target type may have one or more associated geometric characteristics. For example, each target type may be associated with a target width, a target height, a target depth, a target focus distance, a target surface texture parameter, a target color parameter, a target scheme (e.g., dark-light-dark, light-dark-light, etc.), a model topographic profile (e.g., a two-dimensional or three-dimensional shape of some or all of the target), etc.

At stage 1208, scanner settings are acquired. The scanner settings may include some or all of the scanner settings from the spot scanner profile generated at stage 1116 of FIG. 11. In some embodiments, the scanner properties are acquired and/or adjusted according to the target model properties acquired in stage 1204. For example, better results may be obtained from the topographic scan for different types of targets in relation to the transmission source brightness, direction in which the transmission source is pointed, speed at which the scanner is moved, sample rate at which data is collected, etc.

A scan window is determined at stage 1212 according to target model properties and scanner settings. In one illustrative case, the scan window is set to be a full range of motion across a magazine (e.g., a full range of X locations). In another illustrative case, the scan window is set to be a certain margin on either side of the model target location. The scan window can be set in any useful way. At stage 1216, the spot scanner is swept across the scan window to obtain raw topographical data. For example, the hand assembly is positioned and pointed so that the spot scanner is pointing in a desired direction at one edge of the scan window, and the hand assembly is driven so as to sweep the spot scanner to the other extent of the scan window.

The raw topographical data can be obtained under many different conditions, according to different scanner settings. For example, as described above, the spot scanner may be swept across the scan window at a particular scan speed, and the raw topographical data may be recorded at a particular sampling rate, as dictated by various scanner settings. In some implementations, one or more scanner settings can be dynamically changed or changed according to feedback during the scanning process. For example, as raw topographical data is collected, the scan speed and/or sampling rate can be dynamically adjusted to maintain a data density or to increase data density around certain geometric features. Some scanner settings dictate how scanning will take place within the scan window. For example, a horizontal scan move start and/or finish point can be set to determine the extents of the sweep (e.g., the start and end points of the scan window); a vertical scan move start point can be set to determine a Z-location at which the sweep will begin; a "trip point" can be set to determine how far after the sweep begins to begin sampling data; etc. In some embodiments, a sweep pattern and/or a path is set. For example, collection of raw topographical data by the spot scanner may involve sweeping across the scan window multiple times at the same Z-position in the same or different directions, sweeping across the scan window multiple times at different Z-positions in the same or different directions, sweeping across the scan window one or more times in one or more directions along the defined path having a varying Z-position, etc. Some scanner settings affect the manner in which the target surface (e.g., geometric feature, etc.) is illuminated by the spot scanner transmitter and/or the manner in which reflected radiation is captured by the spot scanner receiver. For example, a drive voltage can be adjusted to affect the brightness of the laser being used as part of a VCSEL spot scanner transmitter. Alternatively or additionally, the scan angle can be set (e.g., by adjusting a wrist angle for the hand assembly), which may optimize the level of glare, the amplitude of the return signal, and/or other characteristics of the signal. For example, for topographic scans, it may be desirable to illuminate the target surface at a maximum level in order to optimally detect features at different depths, particularly for implementations in which the spot scanner has a fixed (or substantially fixed) focal length. Some implementations include features that are designed specifically to reflect or deflect (e.g., scatter, absorb, etc.) radiation from the spot scanner, as desired.

As discussed above, some embodiments set some or all of the scanner settings according to the type or types of targets expected in the scan window. For example, some magazine targets are designed in a substantially rectangular fashion having a long axis and a short axis with the long axis pointing vertically. In this orientation, it will be appreciated that the target is more likely to be detected when scanning across the long axis (e.g., in a scan direction that is orthogonal to the long axis) than when scanning across the short axis. Accordingly, location of such a magazine target may involve setting the scanner to sweep in a horizontal direction first to effectively find the vertical edges of the rectangle, then to sweep in a vertical direction at a horizontal location that is between the vertical edges found in the previous scan to effectively find the horizontal edges of the rectangle. Using techniques such as the above, the size of the scan window, scan speed, etc. can be optimized, for example, to speed up target location and/or other functionality.

The raw topographical data can be recorded in any useful way. In some implementations, the raw topographical data is a binary file of samples representing a voltage output from the spot scanner receiver versus scan sampling times. Each sample may effectively indicate a depth at a location. At stage 1220, the raw topographical data is decoded to generate the target profile. In some embodiments, one or more filters are used on the topographical data to process the data for analysis. For example, a high-frequency filter may be applied to the raw topographical data to smooth the data (e.g., to get rid of spikes in the data). Similarly data recorded as a function of scan time may be converted to reflect scan position or distance, for example, by multiplying scan velocity at that time. Some embodiments interpret the data to generate a series of threshold values that divides the voltage data into bright and dark pattern areas. The bright and dark pattern areas may be recorded as two brightness levels in some implementations (i.e., "bright" or "dark") or as gradations of brightness levels in other implementations (e.g., a brightness level on a scale from 1 to 5). Many other types of processing are possible, including, for example, application of various types of statistics, grouping, sorting, and/or filtering the data in various ways, etc. As illustrated, some embodiments iterate, when desired, using the same or different decoder settings in an attempt to converge on a solution or otherwise improve the decoding.

It will be appreciated that the sampling and processing may be performed differently according to different system implementations. For example, some systems are implemented with one or more levels of buffering more caching to allow some raw topographical data to be post-processed while other raw topographical data continues to be collected. Other systems may be implemented in such a way that the raw topographical data is stored in volatile or non-volatile storage for later post-processing. Further, the data may be collected and/or post-processed in different ways depending on the intended use of the data. For example, data may be gathered differently if the goal is to use the data to accurately calibrate the location of the hand assembly according to an edge of a target than if the goal is to use the data to topographically map a region for target recognition purposes. As described above, some implementations use multiple scan passes (e.g. in the same or different directions, at the same or different Z-locations, at the same or different scan angle, etc.) to collect data. In these implementations, processing of the data at stage 1220 can involve combining the various data sets from the various scan passes according to one or more techniques. For example, scan passes may be independently processed to yield solutions which are then compared to determine or generate a most valid solution. Alternatively, data from multiple scan passes can be processed together to increase the statistical significance of certain results.

At stage 1224, embodiments validate the target profile against the target model properties. While certain validation of the raw topographical data and/or post-processed topographical data may be performed during stage 1220, the data is further validated in stage 1224 against other types of data, such as expected values according to target model properties. In one illustrative use case, the target model properties include a model target center point, which is compared against a target center point calculated from the processed topographical data. This technique can be used to validate the location of a target according to a cell map. Any variation between the expected location and the calculated (detected) location may suggest a variance in the position of the target context (e.g., the magazine), a variance between expected and actual locations of the hand assembly, a manufacturing variance or error in the target itself, other system or component level calibration errors, etc. Other scans of the same or other features can be used to determine which of these possibilities contributed to the variation.

Many types of targets or other geometric features are possible, depending on the context. For example, in the context of an illustrative data storage system, targets may be categorized generally into four categories: media cartridge targets, magazine targets, mail slot targets, and media drive targets. Media cartridge targets may include, for example, a write-lock switch, media cartridge notches or edge features, etc. Magazine targets may include, for example, targets that identify edges of the magazine, slot locations within the magazine, etc. Mail slot targets may be different from, similar to, or identical to magazine targets. For example, it may be desirable to include a mail slot target that accurately locates a latch by which the robot hand assembly can release the mail slot for external access by user. Media drive targets may include, for example, targets that identify edges of the media drive, edges of the media drive slot, and/or other features. Any other feature can be designed in such a way that is recognizable as a target. In some embodiments, each target type is associated with one or more geometric characteristics. For example, each target may be associated with one or more of a target width, a target height, a target focus distance (e.g., depth), a target surface texture parameter, a target color parameter, a target scheme (e.g., dark-light-dark, light-dark-light, etc.), etc.

Decoding at stage 1224 can include validation or recognition of target types and/or their associated geometric characteristics. In one example, processed topographical data is used to determine a calculated target width, which is compared against an expected target width from the target model properties either to validate the reliability of the detected target or to determine which type of target was detected. In another example, a number of width solutions are compared against a model target width to determine how many of the width solutions are within some threshold of the model target width, which may indicate a reliability of the detection. In yet another example, a recorded peak-to-peak voltage of the received and processed topographical data (e.g. and/or a "volts at solution" calculation) can be validated against the model target focus distance, or the like, to help validate the reliability of the detection.

For the sake of illustration, it is desirable to detect the presence of the media cartridge in a particular magazine slot location. The scanner is instructed to sweep across a scan window in a location where a write-lock switch of the media cartridge in that particular slot location would be if the media cartridge is present improperly installed in the magazine. One possible scan result would indicate topologically that no cartridges present at all in that slot location (e.g., the detected depth over the scan window suggests an empty slot). Another possible scan result would indicate topologically that the write-lock switch is present in its expected location, further indicating the presence and proper installation of the media cartridge in the slot location. Yet another possible scan result would indicate detection of the surface at approximately the expected depth, but without the expected geometric profile of the write-lock switch. This may indicate, for example, that the cartridges present but improperly installed (e.g., upside down, etc.).

At stage 1228, a determination is made as to whether the target is valid according to stage 1224. It will be appreciated from the above that targets may be considered valid in different ways, for example, when the target has detected geometric characteristics that match its model target properties within some threshold, when the target is one that could be detected and/or recognized to some threshold certainty level, etc. If the target is determined to be valid the validated target profile can be output as a scan results at stage 1232. The validated target profile can be output in any useful way. For example, the output may simply indicate that the scanned target is "valid" or that the scan was "successful"; the output may include calculated values from the topographical data, such as calculated center points, target widths, etc.; the output include a topographical profile (e.g., a topographical map) of some or all of the scan window; etc. A further determination may then be made at stage 1236 as to whether more targets remain to be scanned as part of the method 1140'. For example, the topographic scan may include scanning of multiple targets and/or of the same target multiple times in the same or different ways, etc. If more targets remain to be scanned, embodiments of the method 1140' return to stage 1204 for further scanning. If no more targets remain to be scanned, embodiments of the method 1140' end at stage 1240.

If, at stage 1228, it is determined that the detected target is invalid or the target detection was unsuccessful, some embodiments attempt to rescan with different settings. At stage 1244, a determination is made as to whether more settings are available to try. A particular sequence of variables may be available to try and different orders and/or to be changed by different amounts. For example, predetermined adjustments may be made to transmitter brightness level, scan angle, horizontal and/or vertical scan position, scan direction, sample rate, scan speed, etc. If additional settings are available to try, the scanner settings may be adjusted accordingly at stage 1248, and embodiments may return to stage 1216 with those adjusted settings. If no additional settings are available to try, embodiments may output an error indication at stage 1252. For example, an error flag may be set to indicate that the scan was unsuccessful, but the target was invalid, that the target could not be detected, etc. In some embodiments, additional user input is allowed or required. For example, the user may be prompted to manually adjust scanner settings for additional attempts at detecting the target, or to provide additional instructions as to how to proceed. Embodiments may end the method 1140' at stage 1240.

Figure 13:
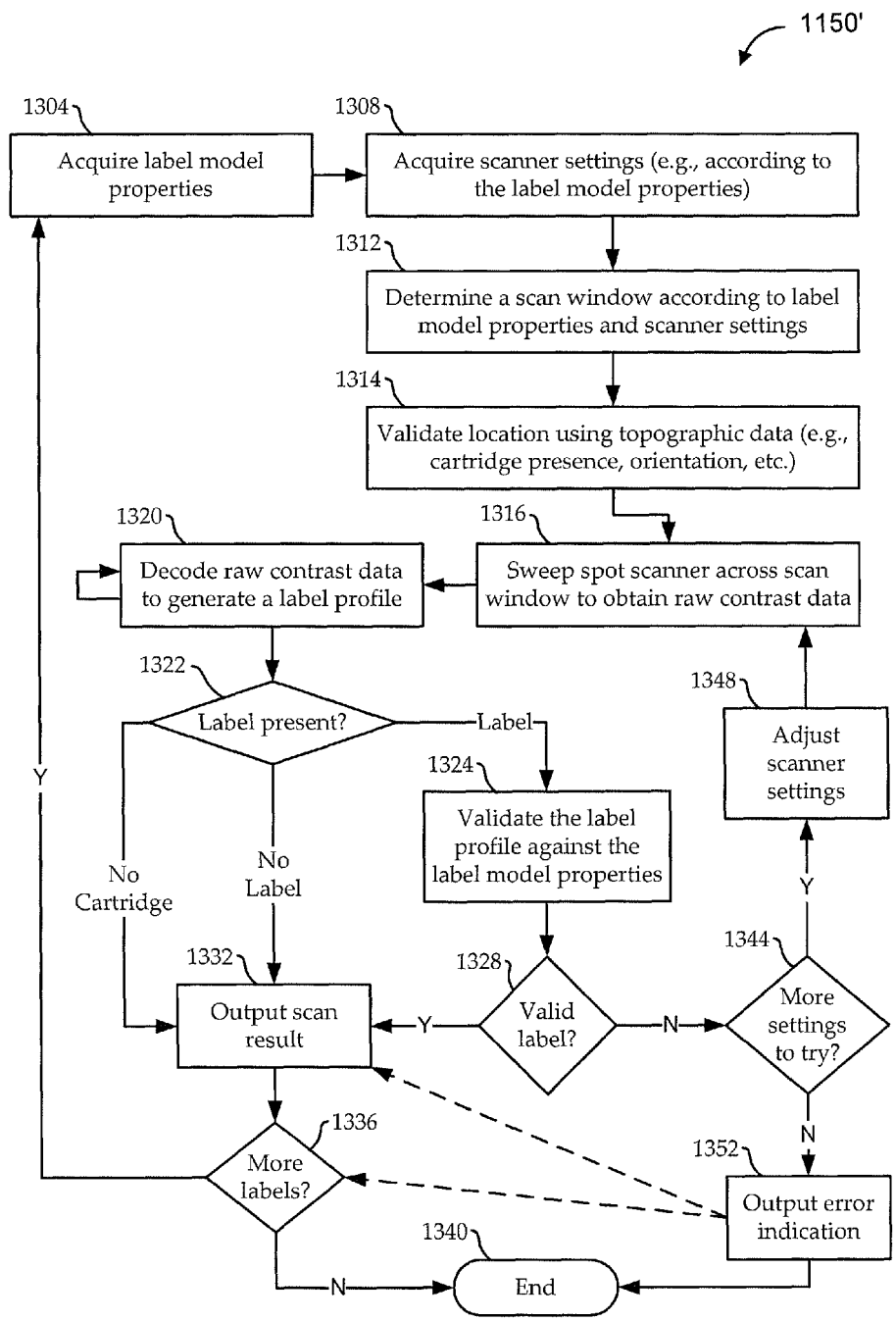
FIG. 13 shows a flow diagram of an illustrative method for performing contrast spot scanning, according to various embodiments.

FIG. 13 shows a flow diagram of an illustrative method 1150' for performing contrast spot scanning, according to various embodiments. The method 1150' may illustrate some embodiments of stage 1150 of FIG. 11. For example, a controller of the data storage system may direct scanning of one or more cartridge labels in the system environment. Embodiments begin at stage 1304 by acquiring label model properties. The label model properties may include any useful data for modeling the labels, for example, including model label types, model label geometrical characteristics, model label locations, etc. In some embodiments, a cell map is maintained that includes the types and locations (e.g., label center or edge coordinates) for all labels in the data storage system. Various label types are possible, including, for example, barcode labels (e.g., 3-of-9 format, standard-size barcode labels), single character labels, "quick response" (QR) code labels, and/or others. Each label type may have one or more associated geometric characteristics. For example, each label type may be associated with a label width (e.g., a label usable width), a label height (e.g., a label usable height), a label location relative to another feature (e.g., location of one or more label edges relative to one or more cartridge edges), a label (or sensor) focus distance, a label surface texture parameter, a label contrast quotient (e.g., characterizing the amount of contrast between different symbol characteristics, like light versus dark bars), a label color parameter, a label code scheme (e.g., barcode format, QR code format, etc.), etc.

At stage 1308, scanner settings are acquired. The scanner settings may include some or all of the scanner settings from the spot scanner profile generated at stage 1116 of FIG. 11. In some embodiments, the scanner properties are acquired and/or adjusted according to the label model properties acquired in stage 1304. For example, better results may be obtained from the contrast scan for different types of labels in relation to the transmission source brightness, direction in which the transmission source is pointed, speed at which the scanner is moved, sample rate at which data is collected, etc. In some embodiments, similar or identical scanner settings are used for the contrast scan as those used for the topologic scan described above with reference to FIG. 12. In other embodiments, the scanner settings are specifically optimized to facilitate contrast scanning. For example, as discussed above, the scanner may be oriented to reduce glare for high-contrast labels.

A scan window is determined at stage 1312 according to label model properties and scanner settings. In one illustrative case, the scan window is set to be a full range of motion across a magazine (e.g., a full range of X locations). In another illustrative case, the scan window is set to be a certain margin on either side of the model label location (e.g., the full extent of a particular magazine slot location, the full extent of a cartridge dimension, a window calculated according to label center location and label usable width, etc.). The scan window can be set in any useful way.

In some embodiments, additional information is obtained using topologic scanning techniques. At stage 1314, location information can be obtained (e.g. validated, identified, generated, etc.) by using the same or another spot scanner to perform a topographic scan. For example, the topographic scan can be used to find whether a cartridge is present in a particular magazine slot location, whether the cartridge is oriented correctly (e.g. whether it is installed right side up), etc. Alternatively, some or all of this information can be obtained from the contrast scanning itself. For example, it may be possible using contrast scanning techniques to develop a contrast profile that can indicate that no cartridges present, that a label is upside down, they cartridges present with no label, etc. As discussed above, the same spot scanner can be used for both topologic scanning and contrast scanning according to some embodiments. Accordingly, some implementations can exploit this dual functionality in serial, parallel, or other ways. For example, topologic scanning functionality of a spot scanner can be used to locate certain geometric features from which the location of a label can be derived; and contrast scanning functionality of the same spot scanner can then be used to read the label.

At stage 1316, the spot scanner is swept across the scan window to obtain raw contrast data. The raw contrast data can be obtained under many different conditions, according to different scanner settings. For example, as described above, the spot scanner may be swept across the scan window at a particular scan speed, and the raw contrast data may be recorded at a particular sampling rate, as dictated by various scanner settings. In some implementations, one or more scanner settings can be dynamically changed or changed according to feedback during the scanning process. For example, as raw contrast data is collected, the scan speed and/or sampling rate can be dynamically adjusted to maintain a data density or to increase data density as symbol density increases or relative contrasts decrease.

Some scanner settings dictate how scanning will take place within the scan window. For example, a horizontal scan move start and/or finish point can be set to determine the extents of the sweep (e.g., the start and end points of the scan window); a vertical scan move start point can be set to determine a Z-location at which the sweep will begin; a "trip point" can be set to determine how far after the sweep begins to begin sampling data; etc. In some embodiments, a sweep pattern and/or a path is set. For example, collection of raw contrast data by the spot scanner may involve sweeping across the scan window multiple times at the same Z-position in the same or different directions, sweeping across the scan window multiple times at different Z-positions in the same or different directions, sweeping across the scan window one or more times in one or more directions along the defined path having a varying Z-position, etc. For example, the same barcode may be read more accurately at a slightly different Z-location due to glare issues, damage to the label, bubbles in the label application, etc. Some scanner settings affect the manner in which the label surface (e.g., barcode, etc.) is illuminated by the spot scanner transmitter and/or the manner in which reflected radiation is captured by the spot scanner receiver. For example, a drive voltage can be adjusted to affect the brightness of the laser being used as part of a VCSEL spot scanner transmitter. Alternatively or additionally, the scan angle can be set (e.g., by adjusting a wrist angle for the hand assembly), which may optimize the level of glare, the amplitude of the return signal, and/or other characteristics of the signal to account for different types of labels.

The raw contrast data can be recorded in any useful way. In some implementations, the raw contrast data is a binary file of samples representing a voltage output from the spot scanner receiver versus scan sampling times. Each sample may effectively indicate a brightness level at a location. At stage 1320, the raw contrast data is decoded to generate the label profile. Various filters may be used to process the data for analysis. In some embodiments, different filters are applied at different times to produce different output for different processing purposes. For example, a low pass filter may be used to smooth out spikes and data to allow for easier calculations of variance, and the like. High pass filters may additionally or alternatively be used, for example, to nominalize all voltages around a threshold line (e.g., 0 V). As illustrated, some embodiments iterate, when desired, using the same or different decoder settings in an attempt to converge on a solution or otherwise improve the decoding.

According to some embodiments, at stage 1322, a determination is made as to whether a cartridge and/or a label this present at all prior to attempting to read the label. In some implementations, a low pass filter is applied to the data and experience value of the data is calculated (e.g., around a mean value). Variances below a predetermined noise parameter may indicate an empty cell condition (i.e., where no cartridges present), while variances above the same or a different noise parameter may indicate that a cartridges present. In some cases, the variance values can be used to determine, not only whether a cartridges present, but whether a label is present on the cartridge. Accordingly, in one illustrative embodiment, there may be three possible results to the determination of stage 1322: a condition in which no cartridge (and no label) is found, a condition in which a cartridge is found apparently without a label, and a condition in which a cartridge is found apparently with a label. Various implementations may treat the no cartridge and/or no label conditions in different ways. For example implementations may output an error indication (e.g., a flag, a log entry, etc.), or any other useful information. This information may be output as the scan result at stage 1332.

If a determination is made at stage 1322 that a label is present, an attempt may be made at stage 1324 to validate the label. While certain validation of the raw topographical data and/or post-processed topographical data may be performed during stage 1320, the data is further validated in stage 1324 against other types of data, such as expected values according to label model properties. For example various implementations may use one or more algorithms to attempt to decode the label contents based on the contrast data, and the label may be validated based on the decoded contents. In one implementation, the raw contrast data is passed through a high pass filter, which may nominalize the voltage values around a zero full threshold line. More reflective areas (e.g., higher voltages indicating white label bars of a barcode) may fall above the threshold, while less reflective areas (e.g., lower voltages indicating black label bars of a barcode) may fall below the threshold. Alternatively, data recorded as a function of scan time may be converted to reflect scan position or distance, for example, by multiplying scan velocity at that time. Some embodiments interpret the data to generate a series of threshold values that divides the voltage data into bright and dark pattern areas. The bright and dark pattern areas may be recorded as two brightness levels in some implementations (i.e., "bright" or "dark") or as gradations of brightness levels in other implementations (e.g., a brightness level on a scale from 1 to 5). In other embodiments, the label model properties include a model label center point, which is compared against a label center point that can be calculated from the processed contrast data.

In some implementations additional calculations are used for validation, for example, to generate bar width statistics, bar type designators according to various bar type model profiles, etc. For example barcodes and/or other types of labeling schemes may have predictable or predefined preambles, post-ambles, mid-ambles, allowed pattern widths, allowed contrast resolutions, allowed colors, etc. Many other types of processing are possible, including, for example, application of various types of statistics, grouping, sorting, and/or filtering the data in various ways, etc. Additionally, validating the label may include decoding the values (e.g., alphanumeric symbols, etc.) being communicated by the label. For example, a barcode may be decoded to retrieve alphanumeric results, to look for bad characters, to look for incorrect label formatting, etc.

It will be appreciated that the sampling and processing may be performed differently according to different system implementations. For example, some systems are implemented with one or more levels of buffering more caching to allow some raw contrast data to be post-processed while other raw contrast data continues to be collected. Other systems may be implemented in such a way that the raw contrast data is stored in volatile or non-volatile storage for later post-processing. Further, the data may be collected and/or post-processed in different ways depending on the intended use of the data. As described above, some implementations use multiple scan passes (e.g. in the same or different directions, at the same or different Z-locations, at the same or different scan angle, etc.) to collect data. In these implementations, processing of the data at stage 1320 can involve combining the various data sets from the various scan passes according to one or more techniques. For example, scan passes may be independently processed to yield solutions which are then compared to determine or generate a most valid solution. Alternatively, data from multiple scan passes can be processed together to increase the statistical significance of certain results.

At stage 1328, a determination is made as to whether the label is valid according to stage 1324. It will be appreciated from the above that labels may be considered valid in different ways, for example, when they are present, properly oriented, and have valid identification data. If the label is determined to be valid the validated label profile can be output as a scan results at stage 1332. The validated label profile can be output in any useful way. For example, the output may simply indicate that the scanned label is "valid" or that the scan was "successful"; the output may include calculated values from the topographical data, such as calculated center points, label widths, etc.; the output include a contrast profile (e.g., a contrast map) of some or all of the scan window; etc. A further determination may then be made at stage 1336 as to whether more labels remain to be scanned as part of the method 1150'. For example, the contrast scan may include scanning of multiple labels and/or of the same label multiple times in the same or different ways, etc. If more labels remain to be scanned, embodiments of the method 1150' return to stage 1304 for further scanning. If no more labels remain to be scanned, embodiments of the method 1150' end at stage 1340.

If, at stage 1328, it is determined that the detected label is invalid or the label detection was unsuccessful, some embodiments attempt to rescan with different settings. At stage 1344, a determination is made as to whether more settings are available to try. A particular sequence of variables may be available to try and different orders and/or to be changed by different amounts. For example, predetermined adjustments may be made to transmitter brightness level, scan angle, horizontal and/or vertical scan position, scan direction, sample rate, scan speed, etc. If additional settings are available to try, the scanner settings may be adjusted accordingly at stage 1348, and embodiments may return to stage 1316 with those adjusted settings. If no additional settings are available to try, embodiments may output an error indication at stage 1352. For example, in error flag may be set to indicate that the scan was unsuccessful, but the label was invalid, that the label could not be detected, etc. In some embodiments, additional user input is allowed or required. For example, the user may be prompted to manually adjust scanner settings for additional attempts at detecting the label, or to provide additional instructions as to how to proceed. Embodiments may end the method 1150' at stage 1340.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system for scanning in a data storage system, the system comprising:
   a first spot scanner coupled with a carriage, the carriage configured to move in at least a scan direction and to rotate about a reference axis to point the first spot scanner in a detection direction, such that, when the detection direction is perpendicular to the scan direction, the detection direction and the scan direction define four quadrants of the carriage, the first spot scanner being in one of the four quadrants;
   a second spot scanner coupled with the carriage in another of the four quadrants;
   a driver configured to move the carriage in the scan direction to sweep the spot scanners to acquire raw scan data at each of a plurality of locations within at least one scan window; and
   a processor, in communication with the spot scanners, and configured to:
      direct at least one of the spot scanners to acquire the raw scan data;
      decode the raw scan data to generate a scan profile for a purported feature within the at least one scan window; and
      analyze the scan profile to determine a valid feature corresponding to the purported feature and a feature characteristic associated with the valid feature.

2. The system of claim 1, wherein:
   the four quadrants are a first, second, third, and fourth quadrant proceeding in a rotational direction around the reference axis;
   the first spot scanner is in the first quadrant; and
   the second spot scanner is in the fourth quadrant.

3. The system of claim 2, wherein:
   the spot scanners are configured with an optimal detection direction for acquiring the raw scan data; and
   the driver is configured to move the carriage in the scan direction from a first movement extent to a second movement extent to acquire the raw scan data within any portion throughout a scannable region having a first scanning extent and a second scanning extent, such that:
      when the carriage is rotated about the reference axis to point the first scanner in the optimal detection direction, the first scanning extent is sufficiently proximate to the first movement extent, and the second scanning extent is not sufficiently proximate to the second movement extent; and
      when the carriage is rotated about the reference axis to point the second scanner in the optimal detection direction, the first scanning extent is not sufficiently proximate to the first movement extent, and the second scanning extent is sufficiently proximate to the second movement extent.

4. The system of claim 2, further comprising:
a first target set disposed to a first side of the carriage; and
a second target set disposed to a second side of the carriage opposite the first side with respect to a reference plane, the scan direction being on the reference plane,
wherein the spot scanners are configured with an optimal detection direction for acquiring the raw scan data, and
wherein directing the at least one of the spot scanners to acquire the raw scan data comprises:
   directing the carriage to rotate about the reference axis so as to point the first spot scanner in the optimal detection direction with respect to the first target set, thereby pointing the second spot scanner substantially in the optimal detection direction with respect to the second target set;
   directing the first spot scanner to acquire raw scan data from at least a portion of the first target set; and
   directing the second spot scanner to concurrently acquire raw scan data from at least a portion of the second target set.

5. The system of claim 2, wherein:
the spot scanners are configured with a first optimal detection direction for acquiring raw contrast data and a second optimal detection direction for acquiring raw topographic data; and
directing the at least one of the spot scanners to acquire the raw scan data comprises:
   directing the carriage to rotate about the reference axis so as to point the first spot scanner in the first optimal detection direction, thereby pointing the second spot scanner substantially in the second optimal detection direction;
   directing the first spot scanner to acquire raw contrast data at each of a plurality of locations within a first scan window; and
   directing the second spot scanner to concurrently acquire raw topographic data at each of a plurality of locations within a second scan window.

6. The system of claim 1, wherein:
the four quadrants are a first, second, third, and fourth quadrant proceeding in a rotational direction around the reference axis;
the first spot scanner is in the first quadrant; and
the second spot scanner is in the second quadrant.

7. The system of claim 6, wherein:
the spot scanners are configured with an optimal detection direction for acquiring the raw scan data; and
the driver is configured to move the carriage in the scan direction from a first movement extent to a second movement extent, such that:
   when the carriage is moved to the first movement extent, the first spot scanner can acquire the raw scan data at approximately the first movement extent while pointing in the optimal detection direction; and
   when the carriage is moved to the second movement extent, the second spot scanner can acquire the raw scan data at approximately the second movement extent while pointing in the optimal detection direction.

8. The system of claim 1, wherein:
the reference axis points in a Z direction;
the first spot scanner is at a first Z position with respect to the carriage; and the second spot scanner is at a second Z position with respect to the carriage.

9. The system of claim 8, wherein:
the spot scanners are configured with an optimal detection direction for acquiring the raw scan data; and
the carriage is further configured to move in the Z direction between a first Z-extent and a second Z-extent, such that:
   when the carriage is moved to the first Z-extent, the first spot scanner can acquire the raw scan data at approximately the first Z-extent while pointing in the optimal detection direction and the second spot scanner cannot acquire the raw scan data at approximately the first Z-extent while pointing in the optimal detection direction; and
   when the carriage is moved to the second Z-extent, the first spot scanner cannot acquire the raw scan data at approximately the second Z-extent while pointing in the optimal detection direction and the second spot scanner can acquire the raw scan data at approximately the second Z-extent while pointing in the optimal detection direction.

10. The system of claim 1, wherein the processor is further configured to:
receive a request for scanning of the valid feature;
acquire a feature model according to the request;
acquire scanner settings associated with the feature model; and
direct the at least one of the spot scanners to acquire the raw scan data according to the request and according to the scanner settings.

11. The system of claim 1, wherein:
the raw scan data is raw topographic data;
decoding the raw scan data to generate a scan profile for the purported feature within the at least one scan window comprises decoding the raw topographic data to generate a target profile for a purported target within the at least one scan window, the label profile comprising a scanned target type and scanned target location; and
analyzing the scan profile to determine the valid feature corresponding to the purported feature and the feature characteristic associated with the valid feature comprises analyzing the target profile to determine whether the target profile represents a valid target according to a predefined target model corresponding to the purported target, the scanned target type, and the scanned target location.

12. The system of claim 1, wherein:
the raw scan data is raw contrast data;
decoding the raw scan data to generate a scan profile for the purported feature within the at least one scan window comprises decoding the raw contrast data to generate a label profile for a purported label within the at least one scan window, the label profile comprising a scanned symbol set; and
analyzing the scan profile to determine the valid feature corresponding to the purported feature and the feature characteristic associated with the valid feature comprises analyzing the label profile to determine whether the label profile represents a valid label according to a predefined label model corresponding to the purported label and the scanned symbol set.

13. The system of claim 1, wherein:
directing the at least one of the spot scanners to acquire the raw scan data comprises directing the first spot scanner to acquire first raw scan data and directing the second spot scanner to acquire second raw scan data;

decoding the raw scan data to generate a scan profile for the purported feature within the at least one scan window comprises decoding the first raw scan data to generate a first scan profile for the purported target feature and decoding the second raw scan data to generate a second scan profile for a registration feature; and analyzing the scan profile to determine the valid feature comprises analyzing the first scan profile as a function of the second scan profile to determine the valid feature.

14. The system of claim 1, wherein the spot scanner is a zero-dimensional scanner.

15. The system of claim 1, wherein the spot scanner comprises a vertical-cavity surface-emitting laser (VCSEL).

16. A method for scanning in a data storage system, the method comprising:

moving a carriage using an electromechanical driver to a first movement extent, the carriage configured to move in at least a scan direction between the first movement extent and a second movement extent and to rotate about a reference axis to point at least one of a plurality of spot scanners in a detection direction with reference to a set of target features to acquire raw scan data from the set of target features within any window between a first scanning extent and a second scanning extent;

rotating the carriage to point the first spot scanner in a particular detection direction that is predetermined to be optimal for acquiring raw scan data from the set of target features, the first spot scanner being located on the carriage so that it points substantially at the first scanning extent when the carriage is at the first movement extent and the first spot scanner is pointed in the particular detection direction;

moving the carriage to the second movement extent; and rotating the carriage to point the second spot scanner in the particular detection direction, the second spot scanner being located on the carriage so that it points substantially at the second scanning extent when the carriage is at the second movement extent and the second spot scanner is pointed in the particular detection direction.

17. The method of claim 16, wherein:

when the detection direction of the first spot scanner is perpendicular to the scan direction, the detection direction and the scan direction define first, second, third, and fourth quadrants of the carriage proceeding in a rotational direction about the reference axis;

the first spot scanner is located in the first quadrant;

the second spot scanner is located in the fourth quadrant; and rotating the carriage to point the second spot scanner in the particular detection direction comprises rotating the carriage approximately 180-degrees about the reference axis.

18. A method for scanning in a data storage system, the method comprising:

positioning a carriage using an electromechanical driver in a first position;

rotating the carriage about a reference axis to point a first spot scanner in a first detection direction with reference to a first target feature and to point a second spot scanner in second detection direction with reference to a second target feature, the first and second spot scanners coupled with the carriage in non-adjacent locations; and concurrently acquiring, by sweeping the carriage in a scan direction from the first position to a second position, first raw scan data from the first target feature using the first spot scanner and second raw scan data from the second target feature using the second spot scanner.

19. The method of claim 18, wherein:

the first detection direction forms a first scan angle with reference to the first target feature;

the second detection direction forms a second scan angle with reference to the second target feature; and the first and second scan angles are substantially the same.

20. The method of claim 18, wherein:

the first detection direction is predetermined to be substantially optimal for acquiring raw contrast data; and the second detection direction is predetermined to be substantially optimal for acquiring raw topographic data.

* * * * *

UNITED STATES PATENT AND TRADEMARK OFFICE
CERTIFICATE OF CORRECTION

PATENT NO. : 8,800,858 B2  Page 1 of 1
APPLICATION NO. : 13/464927
DATED : August 12, 2014
INVENTOR(S) : Plutt et al.

It is certified that error appears in the above-identified patent and that said Letters Patent is hereby corrected as shown below:

In the Specification

In column 1, line 22, delete "(IO)" and insert -- (I/O) --, therefor.

In column 5, line 48, delete "and or" and insert -- and/or --, therefor.

In column 6, line 31, delete "IO" and insert -- I/O --, therefor.

In column 6, line 41, delete "and or" and insert -- and/or --, therefor.

Signed and Sealed this
Nineteenth Day of May, 2015

Michelle K. Lee
*Director of the United States Patent and Trademark Office*